US012681652B2

(12) United States Patent
Dawkins et al.

(10) Patent No.: US 12,681,652 B2
(45) Date of Patent: Jul. 14, 2026

(54) DYNAMIC INDEPENDENT SOFTWARE-DEFINED STORAGE (SDS) RESOURCE ADJUSTMENT SYSTEM

(71) Applicant: Dell Products L.P., Round Rock, TX (US)

(72) Inventors: William Price Dawkins, Lakeway, TX (US); Xiangping Chen, Sherborn, MA (US)

(73) Assignee: Dell Products L.P., Round Rock, TX (US)

( * ) Notice: Subject to any disclaimer, the term of this patent is extended or adjusted under 35 U.S.C. 154(b) by 146 days.

(21) Appl. No.: 18/415,747

(22) Filed: Jan. 18, 2024

(65) Prior Publication Data

US 2025/0240253 A1     Jul. 24, 2025

(51) Int. Cl.
*G06F 3/06* (2006.01)
*H04L 41/0897* (2022.01)

(52) U.S. Cl.
CPC ........ *G06F 3/0631* (2013.01); *H04L 41/0897* (2022.05)

(58) Field of Classification Search
CPC ........................... G06F 3/0631; H04L 41/0897
See application file for complete search history.

(56) References Cited

U.S. PATENT DOCUMENTS

| | | | | |
|---|---|---|---|---|
| 8,386,610 B2 * | 2/2013 | Yahalom | ............... | G06F 3/0635 |
| | | | | 718/1 |
| 9,354,921 B2 | 5/2016 | Nelson | | |

| | | | | |
|---|---|---|---|---|
| 10,432,722 B2 * | 10/2019 | Jain | ......................... | G06F 9/5016 |
| 10,768,817 B2 * | 9/2020 | Kesavan | ................. | G06F 3/067 |
| 11,797,197 B1 * | 10/2023 | Karr | ....................... | G06F 3/0614 |
| 12,001,695 B2 * | 6/2024 | Pallipadi | ................. | G06F 3/067 |
| 2004/0088417 A1 * | 5/2004 | Bober | ................. | H04L 67/1097 |
| | | | | 709/227 |
| 2009/0320041 A1 * | 12/2009 | Noguchi | ............... | G06F 3/0646 |
| | | | | 718/105 |
| 2012/0272237 A1 * | 10/2012 | Baron | ................... | G06F 9/5077 |
| | | | | 718/1 |
| 2013/0151774 A1 * | 6/2013 | Bolik | .................. | G06F 11/3485 |
| | | | | 711/E12.017 |
| 2014/0130055 A1 * | 5/2014 | Guha | .................... | G06F 9/5011 |
| | | | | 718/104 |

* cited by examiner

*Primary Examiner* — G. C. Neurauter, Jr.

(74) *Attorney, Agent, or Firm* — Joseph Mencher

(57) ABSTRACT

A dynamic independent SDS resource adjustment system includes a resource management system coupled to compute nodes and storage system(s) including storage devices. The resource management system monitors a first subset of resources the compute node(s) that are being used to provide an SDS system using the storage devices that are assigned to the first subset of resources, determines that first subset of resources require adjustment, and identifies a second subset of resources in the compute node(s) to provide the SDS system, with the second subset of resources different than the first subset of resources. The resource management system then reassigns at least one of the storage devices from at least one of the first subset of resources to at least one of the second subset of resources, and provides the SDS system using the at least one second subset of resources.

20 Claims, 15 Drawing Sheets

Figure 3:
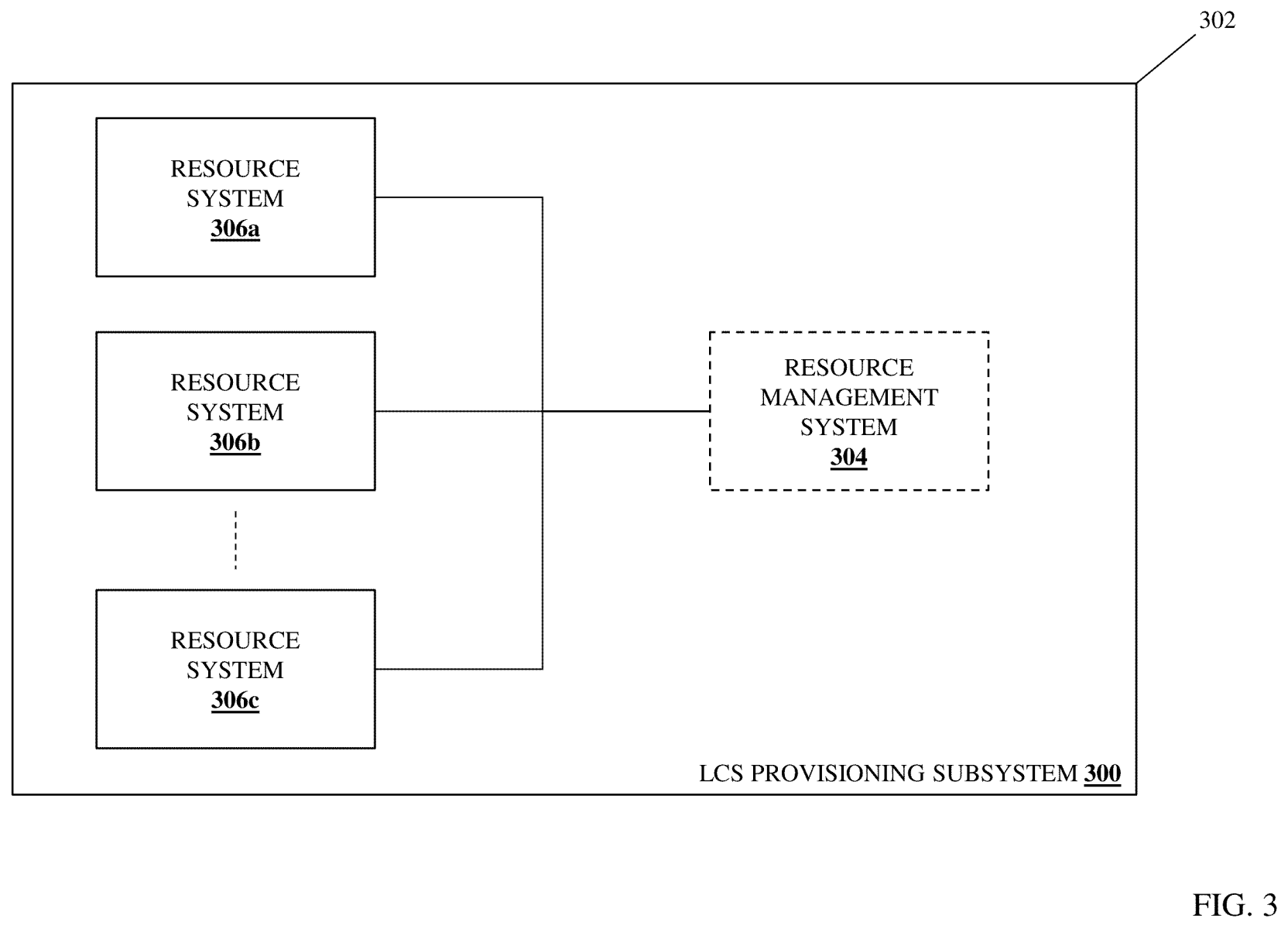

302

RESOURCE
MANAGEMENT
SYSTEM
304

RESOURCE
SYSTEM
306a

RESOURCE
SYSTEM
306b

RESOURCE
SYSTEM
306c

LCS PROVISIONING SUBSYSTEM 300

SCP
DEVICE
406

RESOURCE
DEVICE
404a

RESOURCE
DEVICE
404b

RESOURCE
DEVICE
404c

RESOURCE SYSTEM 400

Figure 8:
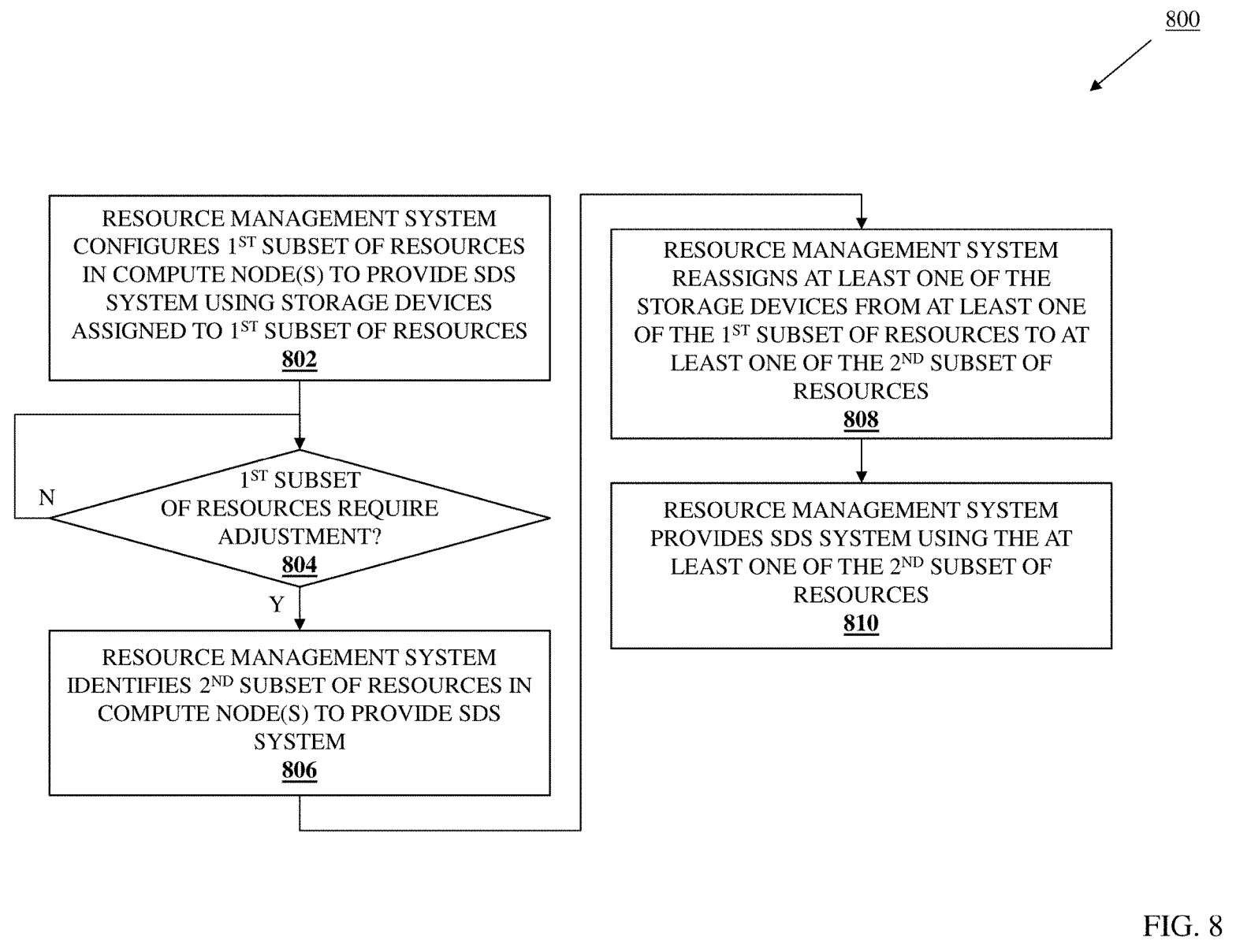

RESOURCE MANAGEMENT SYSTEM CONFIGURES 1ST SUBSET OF RESOURCES IN COMPUTE NODE(S) TO PROVIDE SDS SYSTEM USING STORAGE DEVICES ASSIGNED TO 1ST SUBSET OF RESOURCES
802

1ST SUBSET OF RESOURCES REQUIRE ADJUSTMENT?
804

N

Y

RESOURCE MANAGEMENT SYSTEM IDENTIFIES 2ND SUBSET OF RESOURCES IN COMPUTE NODE(S) TO PROVIDE SDS SYSTEM
806

RESOURCE MANAGEMENT SYSTEM REASSIGNS AT LEAST ONE OF THE STORAGE DEVICES FROM AT LEAST ONE OF THE 1ST SUBSET OF RESOURCES TO AT LEAST ONE OF THE 2ND SUBSET OF RESOURCES
808

RESOURCE MANAGEMENT SYSTEM PROVIDES SDS SYSTEM USING THE AT LEAST ONE OF THE 2ND SUBSET OF RESOURCES
810

DYNAMIC INDEPENDENT SOFTWARE-DEFINED STORAGE (SDS) RESOURCE ADJUSTMENT SYSTEM

BACKGROUND

The present disclosure relates generally to information handling systems, and more particularly to dynamically and independently adjusting resources in information handling systems providing Software Defined Storage (SDS).

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems may be provided using one or more compute nodes that may also be configured as storage nodes that operate as part of a Software Defined Storage (SDS) system that virtualizes storage devices used by the information handling system, and the compute node(s) used to provide an information handling system may be configured by an SDS administrator based on needs of the information handling system. For example, when the requirements of the information handling system from the compute capacity provided by compute resources in the compute node(s) changes, compute node(s) may be added and/or removed to provide the information handling system with its required compute capacity.

However, the compute nodes used to provide conventional SDS systems for information handlings systems also provide storage capacity via storage resources in those compute node(s), networking capacity via networking resources in those compute node(s), and other resource capacity via other resources in those compute node(s), and thus the addition of compute capacity also adds storage, networking, and/other resource capacity that may be unneeded by the information handling system, while the removal of compute capacity may remove storage, networking, and/other resource capacity that may be needed by the information handling system and thus may require that the information be provided more compute capacity than is needed. Furthermore, the addition or removal of storage capacity as described above requires storage rebalancing operations that migrate data between old storage resources and new storage resources, which is time consuming and costly in terms of processing and networking bandwidth.

Accordingly, it would be desirable to provide an SDS resource adjustment system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide a resource management engine that is configured to: monitor a first subset of resources in at least one of a plurality of compute nodes that are being used to provide a Software Defined Storage (SDS) system using a plurality of storage devices that are assigned to the first subset of resources; determine that the first subset of resources in the at least one of the plurality of compute nodes that are being used to provide the SDS system require adjustment; identify a second subset of resources in at least one of the plurality of compute nodes to provide the SDS system, wherein the second subset of resources is different than the first subset of resources; reassign at least one of the plurality of storage devices from at least one of the first subset of resources to at least one of the second subset of resources; and provide the SDS system using the at least one second subset of resources.

BRIEF DESCRIPTION OF THE DRAWINGS

FIG. 3 is a schematic view illustrating an embodiment of an LCS provisioning subsystem that may be included in the LCS provisioning system of FIG. 2.

FIG. 7 is a schematic view illustrating an embodiment of an LCS provisioning system that may provide the dynamic independent SDS resource adjustment system of the present disclosure.

FIG. 8 is a flow chart illustrating an embodiment of a method for dynamic independent SDS resource adjustment.

FIG. 9 is a schematic view illustrating an embodiment of the LCS provisioning system of FIG. 7 operating during the method of FIG. 8.

FIG. 10 is a schematic view illustrating an embodiment of the LCS provisioning system of FIG. 7 operating during the method of FIG. 8.

FIG. 11 is a schematic view illustrating an embodiment of the LCS provisioning system of FIG. 7 operating during the method of FIG. 8.

FIG. 12 is a schematic view illustrating an embodiment of the LCS provisioning system of FIG. 7 operating during the method of FIG. 8.

FIG. 13 is a schematic view illustrating an embodiment of the LCS provisioning system of FIG. 7 operating during the method of FIG. 8.

FIG. 14 is a schematic view illustrating an embodiment of the LCS provisioning system of FIG. 7 operating during the method of FIG. 8.

FIG. 15 is a schematic view illustrating an embodiment of the LCS provisioning system of FIG. 7 operating during the method of FIG. 8.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
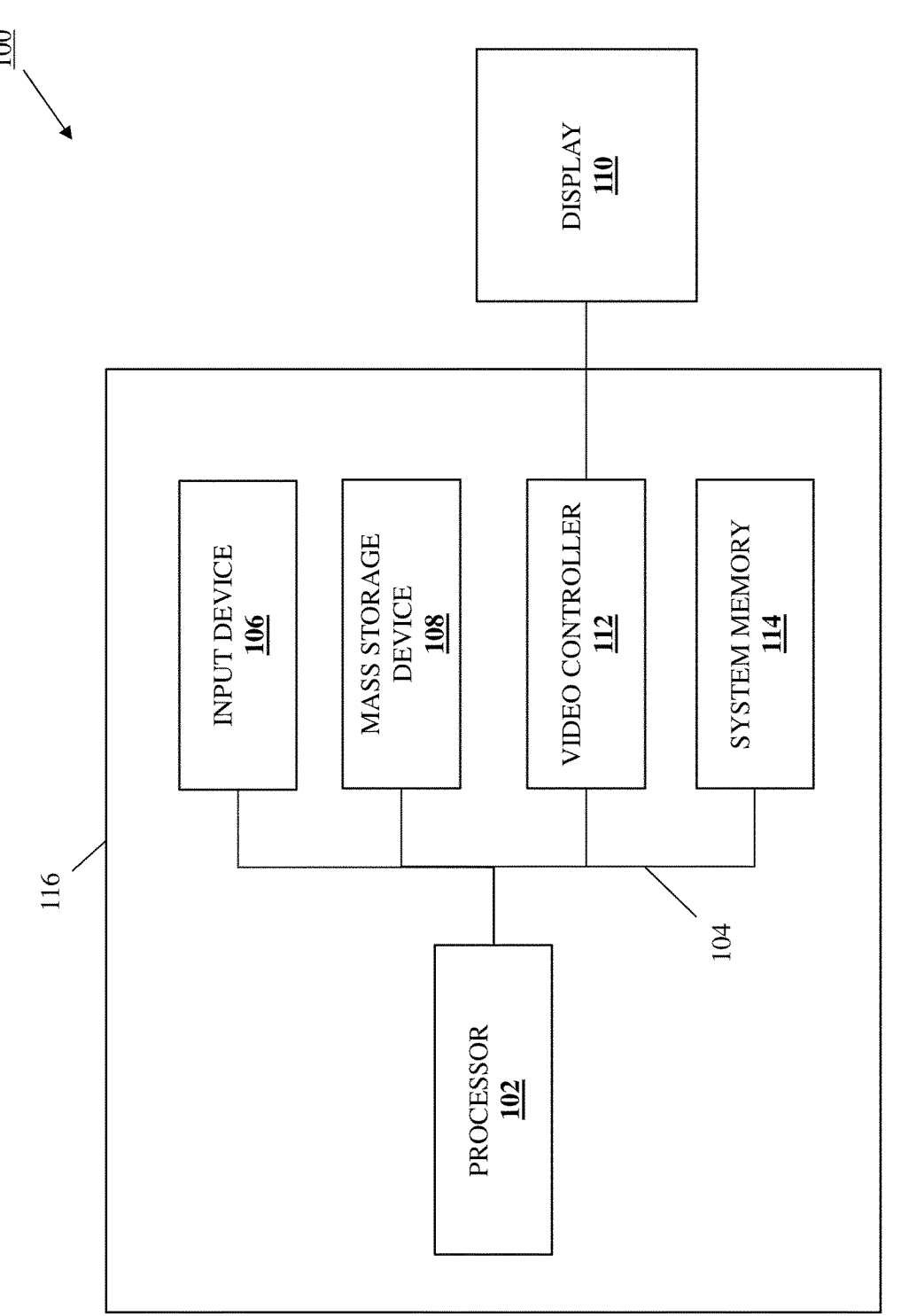
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

As discussed in further detail below, the dynamic independent SDS resource adjustment systems and methods of the present disclosure may be utilized with Logically Composed Systems (LCSs), which one of skill in the art in possession of the present disclosure will recognize may be provided to users as part of an intent-based, as-a-Service delivery platform that enables multi-cloud computing while keeping the corresponding infrastructure that is utilized to do so "invisible" to the user in order to, for example, simplify the user/workload performance experience. As such, the LCSs discussed herein enable relatively rapid utilization of technology from a relatively broader resource pool, optimize the allocation of resources to workloads to provide improved scalability and efficiency, enable seamless introduction of new technologies and value-add services, and/or provide a variety of other benefits that would be apparent to one of skill in the art in possession of the present disclosure.

Figure 2:
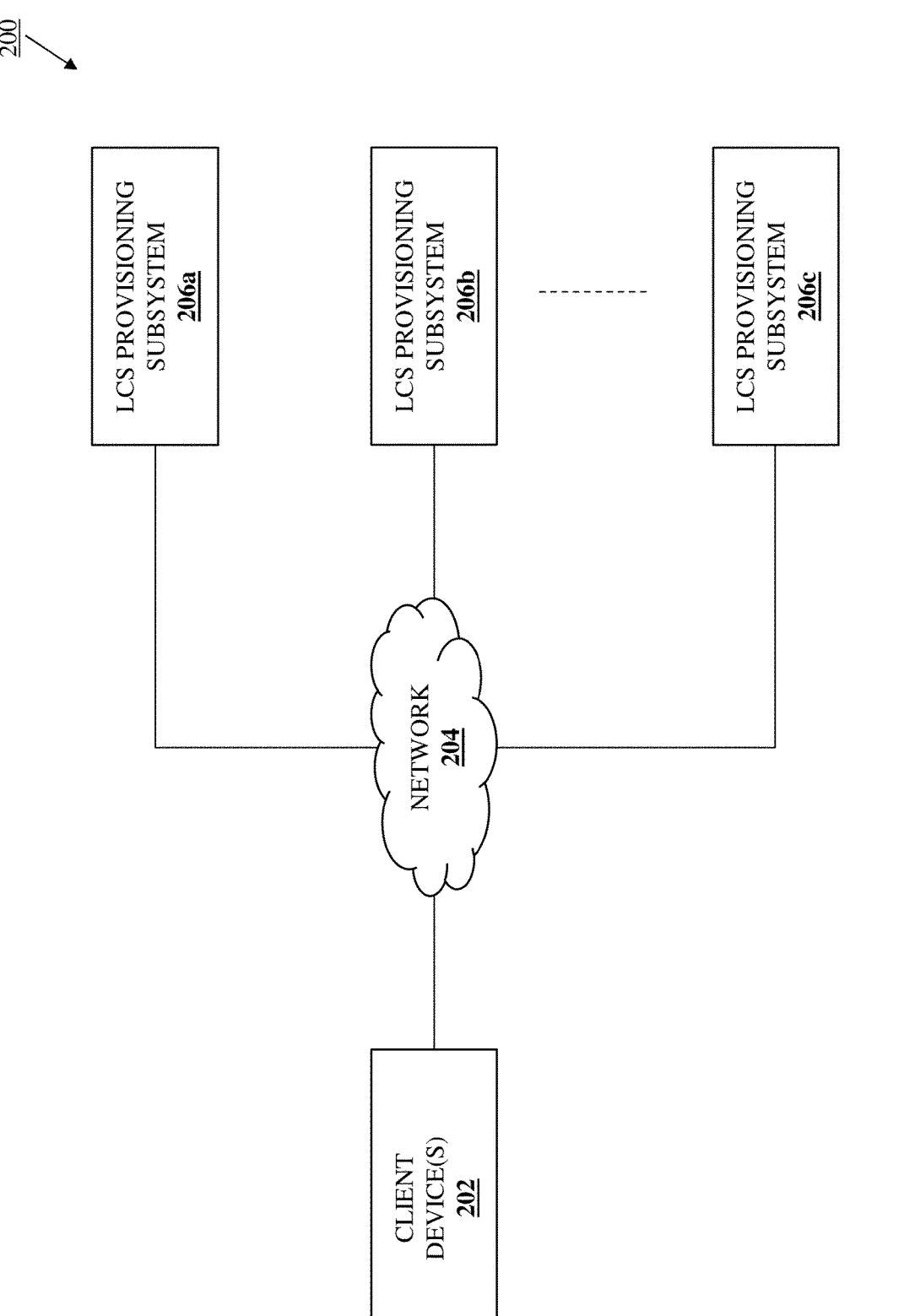
FIG. 2 is a schematic view illustrating an embodiment of an LCS provisioning system.

With reference to FIG. 2, an embodiment of a Logically Composed System (LCS) provisioning system 200 is illustrated that may be utilized with the dynamic independent SDS resource adjustment systems and methods of the present disclosure. In the illustrated embodiment, the LCS provisioning system 200 includes one or more client devices 202. In an embodiment, any or all of the client devices may be provided by the IHS 100 discussed above with reference to FIG. 1 and/or may include some or all of the components of the IHS 100, and in specific examples may be provided by desktop computing devices, laptop/notebook computing devices, tablet computing devices, mobile phones, and/or any other computing device known in the art. However, while illustrated and discussed as being provided by specific computing devices, one of skill in the art in possession of the present disclosure will recognize that the functionality of the client device(s) 202 discussed below may be provided by other computing devices that are configured to operate similarly as the client device(s) 202 discussed below, and that one of skill in the art in possession of the present disclosure would recognize as utilizing the LCSs described herein. As illustrated, the client device(s) 202 may be coupled to a network 204 that may be provided by a Local Area Network (LAN), the Internet, combinations thereof, and/or any of network that would be apparent to one of skill in the art in possession of the present disclosure.

As also illustrated in FIG. 2, a plurality of LCS provisioning subsystems 206a, 206b, and up to 206c are coupled to the network 204 such that any or all of those LCS provisioning subsystems 206a-206c may provide LCSs to the client device(s) 202 as discussed in further detail below. In an embodiment, any or all of the LCS provisioning subsystems 206a-206c may include one or more of the IHS 100 discussed above with reference to FIG. 1 and/or may include some or all of the components of the IHS 100. For example, in some of the specific examples provided below, each of the LCS provisioning subsystems 206a-206c may be provided by a respective datacenter or other computing device/computing component location (e.g., a respective one of the "clouds" that enables the "multi-cloud" computing discussed above) in which the components of that LCS provisioning subsystem are included. However, while a specific configuration of the LCS provisioning system 200 (e.g., including multiple LCS provisioning subsystems 206a-206c) is illustrated and described, one of skill in the art in possession of the present disclosure will recognize that other configurations of the LCS provisioning system 200 (e.g., a single LCS provisioning subsystem, LCS provisioning subsystems that span multiple datacenters/computing device/computing component locations, etc.) will fall within the scope of the present disclosure as well.

With reference to FIG. 3, an embodiment of an LCS provisioning subsystem 300 is illustrated that may provide any of the LCS provisioning subsystems 206a-206c discussed above with reference to FIG. 2. As such, the LCS provisioning subsystem 300 may include one or more of the IHS 100 discussed above with reference to FIG. 1 and/or may include some or all of the components of the IHS 100, and in the specific examples provided below may be provided by a datacenter or other computing device/computing component location in which the components of the LCS provisioning subsystem 300 are included. However, while a specific configuration of the LCS provisioning subsystem 300 is illustrated and described, one of skill in the art in possession of the present disclosure will recognize that other configurations of the LCS provisioning subsystem 300 will fall within the scope of the present disclosure as well.

In the illustrated embodiment, the LCS provisioning subsystem 300 is provided in a datacenter 302, and includes a resource management system 304 coupled to a plurality of resource systems 306a, 306b, and up to 306c. In an embodiment, any of the resource management system 304 and the resource systems 306a-306c may be provided by the IHS 100 discussed above with reference to FIG. 1 and/or may include some or all of the components of the IHS 100. In the specific embodiments provided below, each of the resource management system 304 and the resource systems 306a-306c may include a System Control Processor (SCP) device that may be conceptualized as an "enhanced" SmartNIC device that may be configured to perform functionality that is not available in conventional SmartNIC devices such as, for example, the resource management functionality, LCS provisioning functionality, and/or other SCP functionality described herein.

In an embodiment, any of the resource systems 306a-306c may include any of the resources described below coupled to an SCP device that is configured to facilitate management of those resources by the resource management system 304. Furthermore, the SCP device included in the resource management system 304 may provide an SCP Manager (SCPM) subsystem that is configured to manage the SCP devices in the resource systems 306a-306c, and that performs the functionality of the resource management system 304 described below. In some examples, the resource management system 304 may be provided by a "stand-alone" system (e.g., that is provided in a separate chassis from each of the resource systems 306a-306c), and the SCPM subsystem discussed below may be provided by a dedicated SCP device, processing/memory resources, and/or other components in that resource management system 304. However, in other embodiments, the resource management system 304 may be provided by one of the resource systems 306a-306c (e.g., it may be provided in a chassis of one of the resource systems 306a-306c), and the SCPM subsystem may be provided by an SCP device, processing/memory resources, and/or any other any other components om that resource system.

As such, the resource management system 304 is illustrated with dashed lines in FIG. 3 to indicate that it may be a stand-alone system in some embodiments, or may be provided by one of the resource systems 306a-306c in other embodiments. Furthermore, one of skill in the art in possession of the present disclosure will appreciate how SCP devices in the resource systems 306a-306c may operate to "elect" or otherwise select one or more of those SCP devices to operate as the SCPM subsystem that provides the resource management system 304 described below. However, while a specific configuration of the LCS provisioning subsystem 300 is illustrated and described, one of skill in the art in possession of the present disclosure will recognize that other configurations of the LCS provisioning subsystem 300 will fall within the scope of the present disclosure as well.

Figure 4:
FIG. 4 is a schematic view illustrating an embodiment of a resource system that may be included in the LCS provisioning subsystem of FIG. 3.

With reference to FIG. 4, an embodiment of a resource system 400 is illustrated that may provide any or all of the resource systems 306a-306c discussed above with reference to FIG. 3. In an embodiment, the resource system 400 may be provided by the IHS 100 discussed above with reference to FIG. 1 and/or may include some or all of the components of the IHS 100. In the illustrated embodiment, the resource system 400 includes a chassis 402 that houses the components of the resource system 400, only some of which are illustrated and discussed below. In the illustrated embodiment, the chassis 402 houses an SCP device 406. In an embodiment, the SCP device 406 may include a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide an SCP engine that is configured to perform the functionality of the SCP engines and/or SCP devices discussed below. Furthermore, the SCP device 406 may also include any of a variety of SCP components (e.g., hardware/software) that are configured to enable any of the SCP functionality described below.

In the illustrated embodiment, the chassis 402 also houses a plurality of resource devices 404a, 404b, and up to 404c, each of which is coupled to the SCP device 406. For example, the resource devices 404a-404c may include processing systems (e.g., first type processing systems such as those available from INTEL® Corporation of Santa Clara, California, United States, second type processing systems such as those available from ADVANCED MICRO DEVICES (AMD)® Inc. of Santa Clara, California, United States, Advanced Reduced Instruction Set Computer (RISC) Machine (ARM) devices, Graphics Processing Unit (GPU) devices, Tensor Processing Unit (TPU) devices, Field Programmable Gate Array (FPGA) devices, accelerator devices, etc.); memory systems (e.g., Persistence MEMory (PMEM) devices (e.g., solid state byte-addressable memory devices that reside on a memory bus), etc.); storage devices (e.g., NonVolatile Memory express over Fabric (NVMe-oF) storage devices, Just a Bunch Of Flash (JBOF) devices, etc.); networking devices (e.g., Network Interface Controller (NIC) devices, etc.); and/or any other devices that one of skill in the art in possession of the present disclosure would recognize as enabling the functionality described as being enabled by the resource devices 404a-404c discussed below. As such, the resource devices 404a-404c in the resource systems 306a-306c/400 may be considered a "pool" of resources that are available to the resource management system 304 for use in composing LCSs.

To provide a specific example, the SCP devices described herein may operate to provide a Root-of-Trust (RoT) for their corresponding resource devices/systems, to provide an intent management engine for managing the workload intents discussed below, to perform telemetry generation and/or reporting operations for their corresponding resource devices/systems, to perform identity operations for their corresponding resource devices/systems, provide an image boot engine (e.g., an operating system image boot engine) for LCSs composed using a processing system/memory system controlled by that SCP device, and/or perform any other operations that one of skill in the art in possession of the present disclosure would recognize as providing the functionality described below. Further, as discussed below, the SCP devices describe herein may include Software-Defined Storage (SDS) subsystems, inference subsystems, data protection subsystems, Software-Defined Networking (SDN) subsystems, trust subsystems, data management subsystems, compression subsystems, encryption subsystems, and/or any other hardware/software described herein that may be allocated to an LCS that is composed using the resource devices/systems controlled by that SCP device. However, while an SCP device is illustrated and described as performing the functionality discussed below, one of skill in the art in possession of the present disclosure will appreciated that functionality described herein may be enabled on other devices while remaining within the scope of the present disclosure as well.

Thus, the resource system 400 may include the chassis 402 including the SCP device 406 connected to any combinations of resource devices. To provide a specific embodiment, the resource system 400 may provide a "Bare Metal Server" that one of skill in the art in possession of the present disclosure will recognize may be a physical server system that provides dedicated server hosting to a single tenant, and thus may include the chassis 402 housing a processing system and a memory system, the SCP device 406, as well as any other resource devices that would be apparent to one of skill in the art in possession of the present disclosure. However, in other specific embodiments, the resource system 400 may include the chassis 402 housing the SCP device 406 coupled to particular resource devices 404a-404c. For example, the chassis 402 of the resource system 400 may house a plurality of processing systems (i.e., the resource devices 404a-404c) coupled to the SCP device 406. In another example, the chassis 402 of the resource system 400 may house a plurality of memory systems (i.e., the resource devices 404a-404c) coupled to the SCP device 406. In another example, the chassis 402 of the resource system 400 may house a plurality of storage devices (i.e., the resource devices 404a-404c) coupled to the SCP device 406. In another example, the chassis 402 of the resource system 400 may house a plurality of networking devices (i.e., the resource devices 404a-404c) coupled to the SCP device 406. However, one of skill in the art in possession of the present disclosure will appreciate that the chassis 402 of the resource system 400 housing a combination of any of the resource devices discussed above will fall within the scope of the present disclosure as well.

As discussed in further detail below, the SCP device 406 in the resource system 400 will operate with the resource management system 304 (e.g., an SCPM subsystem) to allocate any of its resources devices 404a-404c for use in a providing an LCS. Furthermore, the SCP device 406 in the resource system 400 may also operate to allocate SCP hardware and/or perform functionality, which may not be available in a resource device that it has allocated for use in providing an LCS, in order to provide any of a variety of functionality for the LCS. For example, the SCP engine and/or other hardware/software in the SCP device 406 may be configured to perform encryption functionality, compression functionality, and/or other storage functionality known in the art, and thus if that SCP device 406 allocates storage device(s) (which may be included in the resource devices it controls) for use in a providing an LCS, that SCP device 406 may also utilize its own SCP hardware and/or software to perform that encryption functionality, compression functionality, and/or other storage functionality as needed for the LCS as well. However, while particular SCP-enabled storage functionality is described herein, one of skill in the art in possession of the present disclosure will appreciate how the SCP devices 406 described herein may allocate SCP hardware and/or perform other enhanced functionality for an LCS provided via allocation of its resource devices 404a-404c while remaining within the scope of the present disclosure as well.

Figure 5:
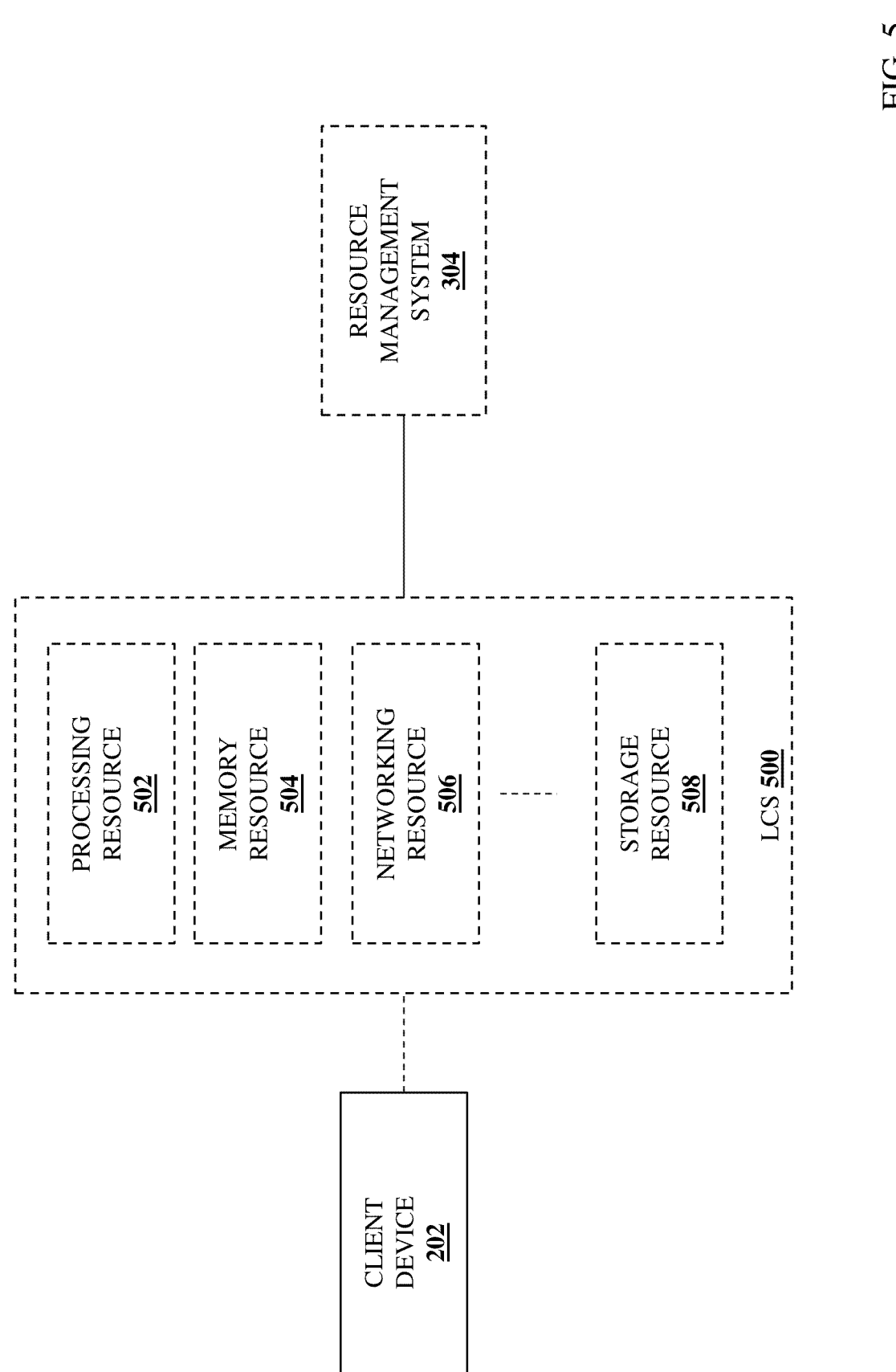
FIG. 5 is a schematic view illustrating an embodiment of the provisioning of an LCS using the LCS provisioning system of FIG. 2.

With reference to FIG. 5, an example of the provisioning of an LCS 500 to one of the client device(s) 202 is illustrated. For example, the LCS provisioning system 200 may allow a user of the client device 202 to express a "workload intent" that describes the general requirements of a workload that user would like to perform (e.g., "I need an LCS with 10 gigahertz (Ghz) of processing power and 8 gigabytes (GB) of memory capacity for an application requiring 20 terabytes (TB) of high-performance protected-object-storage for use with a hospital-compliant network", or "I need an LCS for a machine-learning environment requiring Tensorflow processing with 3 TBs of Accelerator PMEM memory capacity"). As will be appreciated by one of skill in the art in possession of the present disclosure, the workload intent discussed above may be provided to one of the LCS provisioning subsystems 206a-206c, and may be satisfied using resource systems that are included within that LCS provisioning subsystem, or satisfied using resource systems that are included across the different LCS provisioning subsystems 206a-206c.

As such, the resource management system 304 in the LCS provisioning subsystem that received the workload intent may operate to compose the LCS 500 using resource devices 404a-404c in the resource systems 306a-306c/400 in that LCS provisioning subsystem, and/or resource devices 404a-404c in the resource systems 306a-306c/400 in any of the other LCS provisioning subsystems. FIG. 5 illustrates the LCS 500 including a processing resource 502 allocated from one or more processing systems provided by one or more of the resource devices 404a-404c in one or more of the resource systems 306a-306c/400 in one or more of the LCS provisioning subsystems 206a-206c, a memory resource 504 allocated from one or more memory systems provided by one or more of the resource devices 404a-404c in one or more of the resource systems 306a-306c/400 in one or more of the LCS provisioning subsystems 206a-206c, a networking resource 506 allocated from one or more networking devices provided by one or more of the resource devices 404a-404c in one or more of the resource systems 306a-306c/400 in one or more of the LCS provisioning subsystems 206a-206c, and/or a storage resource 508 allocated from one or more storage devices provided by one or more of the resource devices 404a-404c in one or more of the resource systems 306a-306c/400 in one or more of the LCS provisioning subsystems 206a-206c.

Furthermore, as will be appreciated by one of skill in the art in possession of the present disclosure, any of the processing resource 502, memory resource 504, networking resource 506, and the storage resource 508 may be provided from a portion of a processing system (e.g., a core in a processor, a time-slice of processing cycles of a processor, etc.), a portion of a memory system (e.g., a subset of memory capacity in a memory device), a portion of a storage device (e.g., a subset of storage capacity in a storage device), and/or a portion of a networking device (e.g., a portion of the bandwidth of a networking device). Further still, as discussed above, the SCP device(s) 406 in the resource systems 306a-306c/400 that allocate any of the resource devices 404a-404c that provide the processing resource 502, memory resource 504, networking resource 506, and the storage resource 508 in the LCS 500 may also allocate their SCP hardware and/or perform enhanced functionality (e.g., the enhanced storage functionality in the specific examples provided above) for any of those resources that may otherwise not be available in the processing system, memory system, storage device, or networking device allocated to provide those resources in the LCS 500.

With the LCS 500 composed using the processing resources 502, the memory resources 504, the networking resources 506, and the storage resources 508, the resource management system 304 may provide the client device 202 resource communication information such as, for example, Internet Protocol (IP) addresses of each of the systems/devices that provide the resources that make up the LCS 500, in order to allow the client device 202 to communicate with those systems/devices in order to utilize the resources that make up the LCS 500. As will be appreciated by one of skill in the art in possession of the present disclosure, the resource communication information may include any information that allows the client device 202 to present the LCS 500 to a user in a manner that makes the LCS 500 appear the same as an integrated physical system having the same resources as the LCS 500.

Thus, continuing with the specific example above in which the user provided the workload intent defining an LCS with a 10 Ghz of processing power and 8 GB of memory capacity for an application with 20 TB of high-performance protected object storage for use with a hospital-compliant network, the processing resources 502 in the LCS 500 may be configured to utilize 10 Ghz of processing power from processing systems provided by resource device(s) in the resource system(s), the memory resources 504 in the LCS 500 may be configured to utilize 8 GB of memory capacity from memory systems provided by resource device(s) in the resource system(s), the storage resources 508 in the LCS 500 may be configured to utilize 20 TB of storage capacity from high-performance protected-object-storage storage device(s) provided by resource device(s) in the resource system(s), and the networking resources 506 in the LCS 500 may be configured to utilize hospital-compliant networking device(s) provided by resource device(s) in the resource system(s).

Similarly, continuing with the specific example above in which the user provided the workload intent defining an LCS for a machine-learning environment for Tensorflow processing with 3 TBs of Accelerator PMEM memory capacity, the processing resources 502 in the LCS 500 may be configured to utilize TPU processing systems provided by resource device(s) in the resource system(s), and the memory resources 504 in the LCS 500 may be configured to utilize 3 TB of accelerator PMEM memory capacity from processing systems/memory systems provided by resource device(s) in the resource system(s), while any networking/storage functionality may be provided for the networking resources 506 and storage resources 508, if needed.

Figure 6:
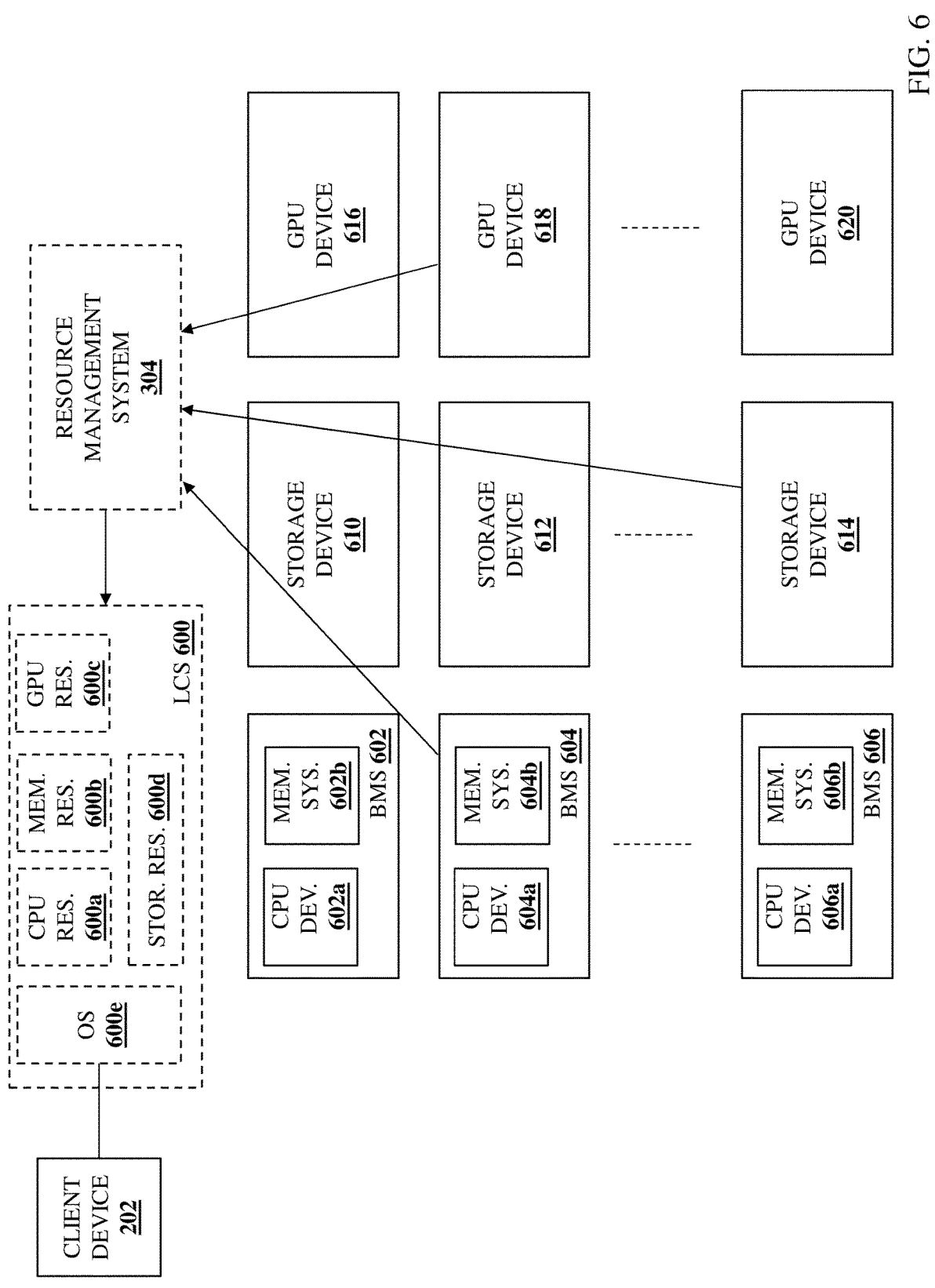
FIG. 6 is a schematic view illustrating an embodiment of the provisioning of an LCS using the LCS provisioning system of FIG. 2.

With reference to FIG. 6, another example of the provisioning of an LCS 600 to one of the client device(s) 202 is illustrated. As will be appreciated by one of skill in the art in possession of the present disclosure, many of the LCSs provided by the LCS provisioning system 200 will utilize a "compute" resource (e.g., provided by a processing resource such as an x86 processor, an AMD processor, an ARM processor, and/or other processing systems known in the art, along with a memory system that includes instructions that, when executed by the processing system, cause the processing system to perform any of a variety of compute operations known in the art), and in many situations those compute resources may be allocated from a Bare Metal Server (BMS) and presented to a client device 202 user along with storage resources, networking resources, other processing resources (e.g., GPU resources), and/or any other resources that would be apparent to one of skill in the art in possession of the present disclosure.

As such, in the illustrated embodiment, the resource systems 306a-306c available to the resource management system 304 include a Bare Metal Server (BMS) 602 having a Central Processing Unit (CPU) device 602a and a memory system 602b, a BMS 604 having a CPU device 604a and a memory system 604b, and up to a BMS 606 having a CPU device 606a and a memory system 606b. Furthermore, one or more of the resource systems 306a-306c includes resource devices 404a-404c provided by a storage device 610, a storage device 612, and up to a storage device 614. Further still, one or more of the resource systems 306a-306c includes resource devices 404a-404c provided by a Graphics Processing Unit (GPU) device 616, a GPU device 618, and up to a GPU device 620.

FIG. 6 illustrates how the resource management system 304 may compose the LCS 600 using the BMS 604 to provide the LCS 600 with CPU resources 600a that utilize the CPU device 604a in the BMS 604, and memory resources 600b that utilize the memory system 604b in the BMS 604. Furthermore, the resource management system 304 may compose the LCS 600 using the storage device 614 to provide the LCS 600 with storage resources 600d, and using the GPU device 318 to provide the LCS 600 with GPU resources 600c. As illustrated in the specific example in FIG. 6, the CPU device 604a and the memory system 604b in the BMS 604 may be configured to provide an operating system 600e that is presented to the client device 202 as being provided by the CPU resources 600a and the memory resources 600b in the LCS 600, with operating system 600e utilizing the GPU device 618 to provide the GPU resources 600c in the LCS 600, and utilizing the storage device 614 to provide the storage resources 600d in the LCS 600. The user of the client device 202 may then provide any application(s) on the operating system 600e provided by the CPU resources 600a/CPU device 604a and the memory resources 600b/memory system 604b in the LCS 600/BMS 604, with the application(s) operating using the CPU resources 600a/CPU device 604a, the memory resources 600b/memory system 604b, the GPU resources 600c/GPU device 618, and the storage resources 600d/storage device 614.

Furthermore, as discussed above, the SCP device(s) 406 in the resource systems 306a-306c/400 that allocates any of the CPU device 604a and memory system 604b in the BMS 604 that provide the CPU resource 600a and memory resource 600b, the GPU device 618 that provides the GPU resource 600c, and the storage device 614 that provides storage resource 600d, may also allocate SCP hardware and/or perform enhanced functionality (e.g., the enhanced storage functionality in the specific examples provided above) for any of those resources that may otherwise not be available in the CPU device 604a, memory system 604b, storage device 614, or GPU device 618 allocated to provide those resources in the LCS 500.

However, while simplified examples are described above, one of skill in the art in possession of the present disclosure will appreciate how multiple devices/systems (e.g., multiple CPUs, memory systems, storage devices, and/or GPU devices) may be utilized to provide an LCS. Furthermore, any of the resources utilized to provide an LCS (e.g., the CPU resources, memory resources, storage resources, and/or GPU resources discussed above) need not be restricted to the same device/system, and instead may be provided by different devices/systems over time (e.g., the GPU resources 600c may be provided by the GPU device 618 during a first time period, by the GPU device 616 during a second time period, and so on) while remaining within the scope of the present disclosure as well. Further still, while the discussions above imply the allocation of physical hardware to provide LCSs, one of skill in the art in possession of the present disclosure will recognize that the LCSs described herein may be composed similarly as discussed herein from virtual resources. For example, the resource management system 304 may be configured to allocate a portion of a logical volume provided in a Redundant Array of Independent Disk (RAID) system to an LCS, allocate a portion/time-slice of GPU processing performed by a GPU device to an LCS, and/or perform any other virtual resource allocation that would be apparent to one of skill in the art in possession of the present disclosure in order to compose an LCS.

Similarly as discussed above, with the LCS 600 composed using the CPU resources 600*a*, the memory resources 600*b*, the GPU resources 600*c*, and the storage resources 600*d*, the resource management system 304 may provide the client device 202 resource communication information such as, for example, Internet Protocol (IP) addresses of each of the systems/devices that provide the resources that make up the LCS 600, in order to allow the client device 202 to communicate with those systems/devices in order to utilize the resources that make up the LCS 600. As will be appreciated by one of skill in the art in possession of the present disclosure, the resource communication information allows the client device 202 to present the LCS 600 to a user in a manner that makes the LCS 600 appear the same as an integrated physical system having the same resources as the LCS 600.

As will be appreciated by one of skill in the art in possession of the present disclosure, the LCS provisioning system 200 discussed above solves issues present in conventional Information Technology (IT) infrastructure systems that utilize "purpose-built" devices (server devices, storage devices, etc.) in the performance of workloads and that often result in resources in those devices being underutilized. This is accomplished, at least in part, by having the resource management system(s) 304 "build" LCSs that satisfy the needs of workloads when they are deployed. As such, a user of a workload need simply define the needs of that workload via a "manifest" expressing the workload intent of the workload, and resource management system 304 may then compose an LCS by allocating resources that define that LCS and that satisfy the requirements expressed in its workload intent, and present that LCS to the user such that the user interacts with those resources in same manner as they would physical system at their location having those same resources.

As will be appreciated by one of skill in the art in possession of the present disclosure, the LCSs discussed above may be configured to store data using a Software Defined Storage (SDS) system, and the inventors of the present disclosure have recognized that the composable infrastructure used to provide those LCSs provides an opportunity to dynamically adjust resources provided in compute nodes independently from storage resources in order to optimize resource utilization by the LCS and prevent the issues with conventional SDS systems discussed above. However, while the dynamic independent SDS resource adjustment system of the present disclosure is illustrated and described as being utilized with an LCS, one of skill in the art in possession of the present disclosure will appreciate how the dynamic independent SDS resource adjustment system of the present disclosure may be utilized in other manners that will fall within the scope of the present disclosure as well.

Figure 7:
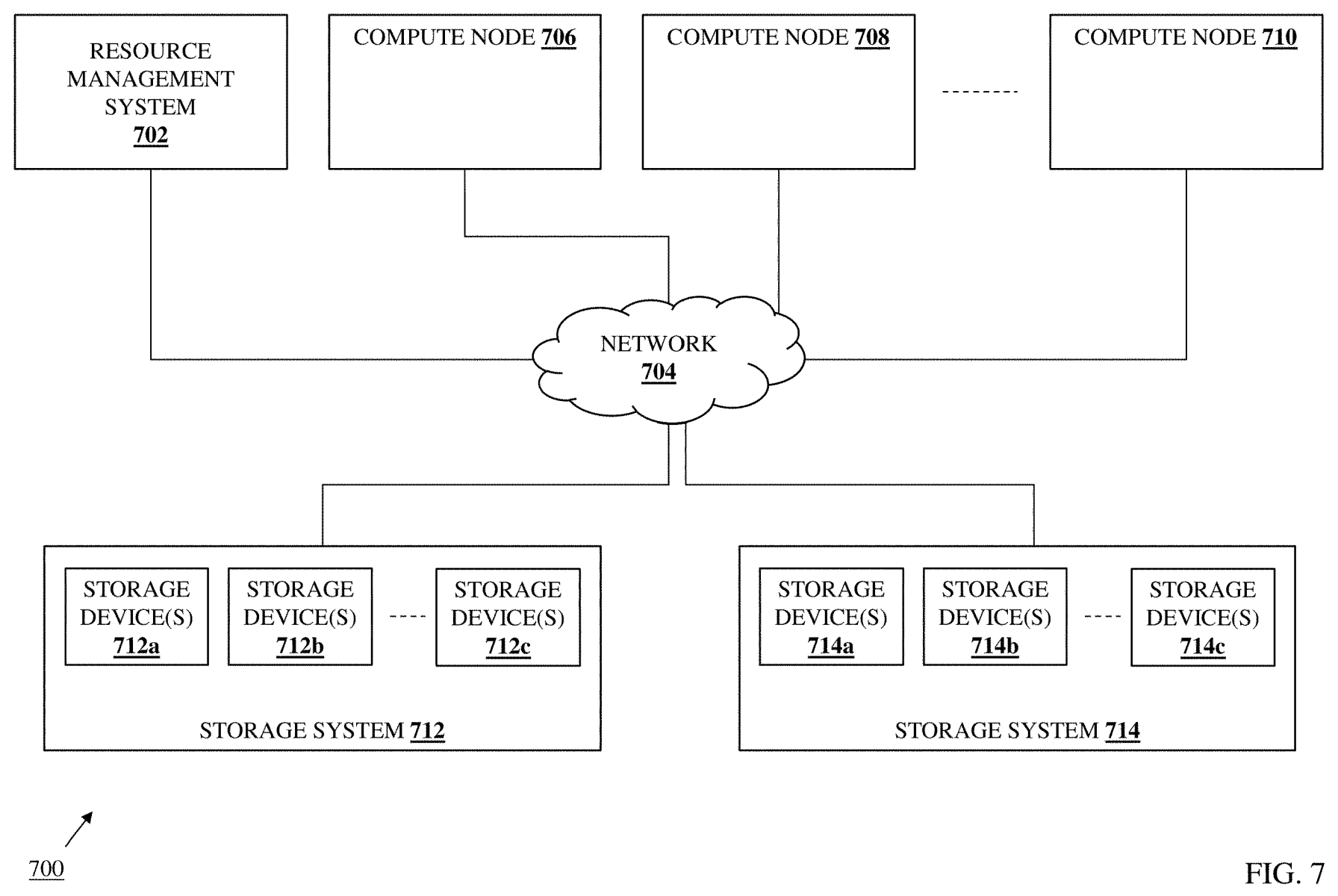

Referring now to FIG. 7, an embodiment of a LCS provisioning system 700 illustrated that may provide the dynamic independent SDS resource adjustment system of the present disclosure. In the illustrated embodiment, the LCS provisioning system 700 includes a resource management system 702 that may be provide by the resource management system 304 discussed above with reference to FIG. 3, and thus may be provided by the SCPM subsystem described above and/or other any other resource management systems that would be apparent to one of skill in the art in possession of the present disclosure. As such, the resource management system 702 may include a resource management memory system that includes instruction that, when executed by a resource management processing system in the resource management system 702, cause the resource management processing system to provide a resource management engine or other resource management subsystem that is configured to perform the resource dynamic independent SDS resource management adjustment functionality described below. As illustrated, the resource management system 702 may be coupled to a network 704 that may be provided by a Local Area Network (LAN), a Wide Area Network (WAN), the Internet, combinations thereof, and/or any other network that would be apparent to one of skill in the art in possession of the present disclosure.

In the illustrated embodiment, a plurality of compute nodes 706, 708, and up to 710 are coupled to the network 704. In an embodiment, any or each of the compute nodes 706-708 may be provided by the resource systems 306*a*-306*c* discussed above with reference to FIG. 3, the resource system 400 discussed above with reference to FIG. 4, the BMSs 602-606 discussed with reference to FIG. 6, and/or any other compute nodes that one of skill in the art in possession of the present disclosure would recognize as being capable of providing the LCS and SDS provisioning functionality described below. As such, each of the compute nodes 706-710 may include compute resources such as the resource devices 404*a*-404*c* discussed above with reference to FIG. 4, the CPU device/memory system combinations 602*a*/602*b*, 604*a*/604*b*, and 606*a*/606*b* discussed above with reference to FIG. 6, and/or other compute resources that would be apparent to one of skill in the art in possession of the present disclosure.

Furthermore, while not illustrated, one of skill in the art in possession of the present disclosure will appreciate how each of the compute nodes 706-710 may be coupled to the network 704 by networking resources in those compute nodes, by an SCP device that includes networking resources as described above, and/or via other manners that will fall within the scope of the present disclosure. Finally, while the discussion herein focuses on compute resources and networking resources, one of skill in the art in possession of the present disclosure will appreciate how the compute nodes 706-710 may include a variety of other resources that may be used to provide the LCS described below while remaining within the scope of the present disclosure as well. However, while specific compute nodes are illustrated and described, one of skill in the art in possession of the present disclosure will appreciate how a variety of compute nodes may be used in the dynamic independent SDS resource adjustment system of the present disclosure while remaining within its scope.

In the illustrated embodiment, a pair of storage systems 712 and 714 are coupled to the network 704, with the storage system 712 including one or more storage device(s) 712*a*, one or more storage device(s) 712*b*, and up to one or more storage device(s) 712*c*; and with the storage system 714 including one or more storage device(s) 714*a*, one or more storage device(s) 714*b*, and up to one or more storage device(s) 714*c*. As will be appreciated by one of skill in the art in possession of the present disclosure, each of the storage systems 712 and 714 may be coupled to the network 704 by networking resources in that storage system, by an SCP device that includes networking resources as described above, and/or via other manners that will fall within the scope of the present disclosure. Furthermore, the storage systems 712 and 714 may include any types of storage devices that one of skill in the art in possession of the present disclosure would recognize as providing the disaggregated storage media used in the SDS system described herein. However, while a specific LCS provisioning system 700 has been illustrated and described, one of skill in the art in possession of the present disclosure will recognize that the dynamic independent SDS resource adjustment system of the present disclosure may be provided in a variety of manners and may include a variety of components and component configurations while remaining within the scope of the present disclosure as well.

Referring now to FIG. 8, an embodiment of a method 800 for dynamic independent Software Defined Storage (SDS) resource adjustment is illustrated. As discussed below, the systems and methods of the present disclosure provide for the independent adjustment of storage resources provided by one or more storage systems utilized in an SDS system, and compute resources, networking resources, and/or other resources provided by compute nodes utilized in that SDS system. For example, the dynamic independent SDS resource adjustment system of the present disclosure may include a resource management system coupled to compute nodes and storage system(s) including storage devices. The resource management system monitors a first subset of resources the compute node(s) that are being used to provide an SDS system using the storage devices that are assigned to the first subset of resources, determines that first subset of resources require adjustment, and identifies a second subset of resources in the compute node(s) to provide the SDS system, with the second subset of resources different than the first subset of resources. The resource management system then reassigns at least one of the storage devices from at least one of the first subset of resources to at least one of the second subset of resources, and provides the SDS system using the at least one second subset of resources. As such compute, networking, and/or other resources provided by compute node(s) utilized in an SDS system may be increased or decreased independently of storage resources provided by storage system(s) in that SDS system in order to optimize the use of each of those resources.

Figure 9:
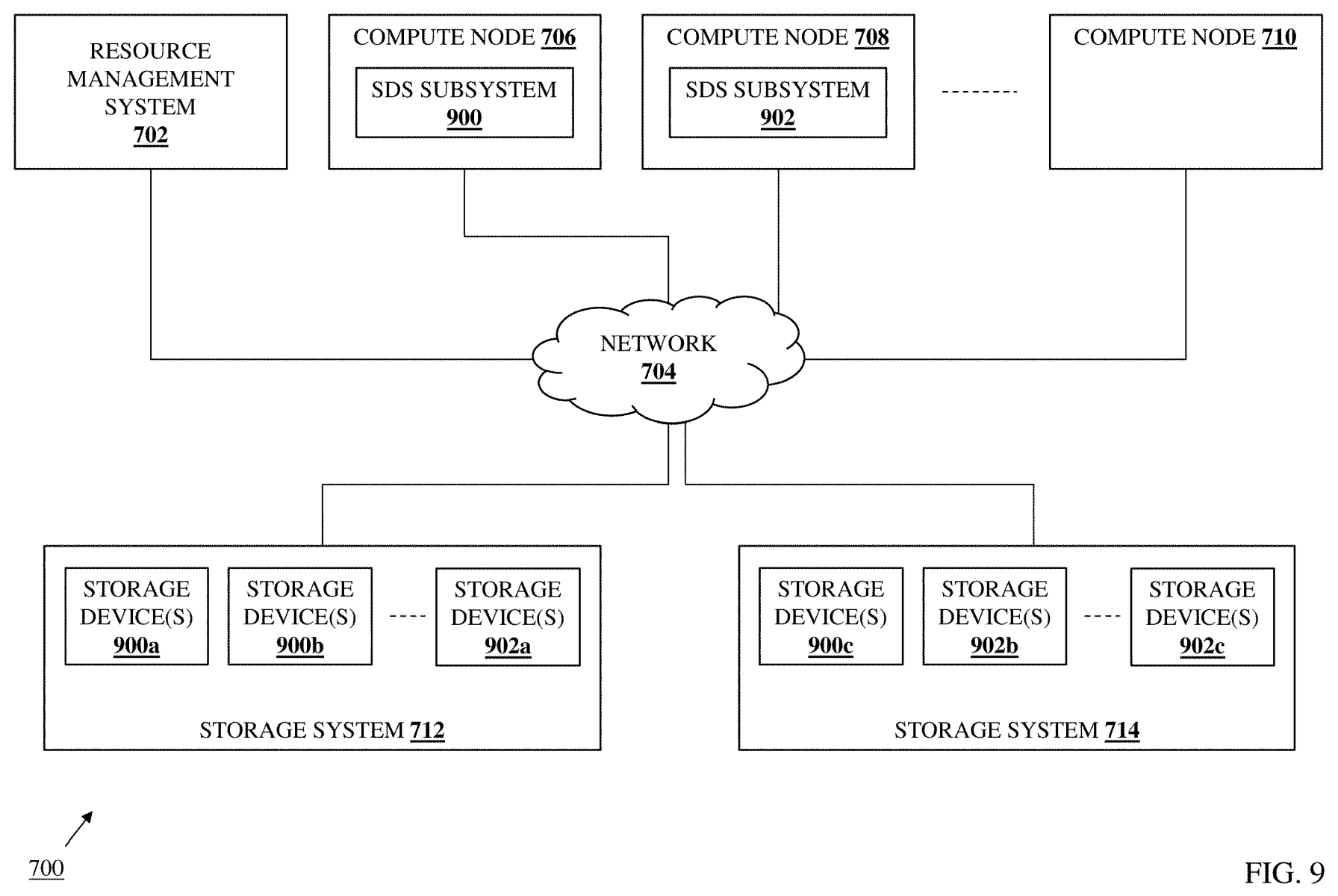

The method 800 begins at block 802 where a resource management system configures a first subset of resources in at least one compute node to provide an SDS system using storage devices that are assigned to the first subset of resources. With reference to FIG. 9, in an embodiment of block 802, the resource management system 702 may utilize the compute nodes 706, 708, and/or 710 in the LCS provisioning system 700 to provide an LCS similarly as described above, which may include configuring any of those compute nodes as "storage nodes" for an SDS system that provides storage for that LCS using the storage systems 712 and 714.

In a first embodiment of a first specific example of the method 800 illustrated in FIG. 9, the resource management system 702 has configured compute resources and networking resources in the compute node 706 to provide an SDS subsystem 900 that operates as a "storage node" using storage resources provided by the storage device(s) 712*a* and 712*b* in the storage system 712 (as indicated by the renumbering of the storage device(s) 712*a* and 712*b* in FIG. 7 to storage device(s) 900*a* and 900*b*, respectively, in FIG. 9), and using storage resources provided by the storage device(s) 714*a* in the storage system 714 (as indicated by the renumbering of the storage device(s) 714*a* in FIG. 7 to storage device(s) 900*c* in FIG. 9). As will be appreciated by one of skill in the art in possession of the present disclosure, the "storage resources" discussed herein may refer to entire storage devices, namespaces in storage devices, and/or any other storage resources that would be apparent to one of skill in the art.

Similarly, in the first embodiment of the first specific example of the method 800 illustrated in FIG. 9, the resource management system 702 has configured compute resources and networking resources in the compute node 708 to provide an SDS subsystem 902 that operates as a "storage node" using storage resources provided by the storage device(s) 712*c* in the storage system 712 (as indicated by the renumbering of the storage device(s) 712*c* in FIG. 7 to storage device(s) 902*a* in FIG. 9), and using storage resources provided by the storage device(s) 714*b* and 714*c* in the storage system 714 (as indicated by the renumbering of the storage device(s) 714*b* and 714*c* in FIG. 7 to storage device(s) 902*b* and 902*c*, respectively, in FIG. 9).

As will be appreciated by one of skill in the art in possession of the present disclosure, the configuration of the compute resources and networking resources in the compute nodes 706 and 708 to provide the SDS subsystems 900 and 902, respectively, that operate as "storage nodes" may include performing SDS configuration operation on those compute resources (e.g., CPU resources and memory resources) in those compute nodes (e.g., in a server device or SCP device included in or connected to that server device), performing SDS configuration operation on networking resources in those compute nodes (e.g., in a server device or SCP device included in or connected to that server device), and/or performing SDS configuration operation on any other resources that one of skill in the art in possession of the present disclosure would recognize as providing the "storage nodes" in the SDS system described below that is utilized by the LCS.

As such, one of skill in the art in possession of the present disclosure will appreciate how the configuration operations performed at block 802 may include any of a variety of conventional SDS storage node composition operations that compose the storage nodes provided by the SDS subsystems 900 and 902 in the compute nodes 706 and 708, respectively, as described above; any of a variety of conventional SDS storage cluster creation operations that create a storage cluster using those storage nodes provided by the SDS subsystems 900 and 902 in the compute nodes 706 and 708, respectively; any of a variety of conventional SDS storage device ownership assignment/attachment operations that assign and attach the storage device(s) 900*a*, 900*b*, and 900*c* to the storage node provided by the SDS subsystem 900 in the compute node 706 and that assign and attach the storage device(s) 902*a*, 902*b*, and 902*c* to the storage node provided by the SDS subsystem 902 in the compute node 708 as described above; any of a variety of conventional SDS metadata provisioning operations that provide metadata on the storage nodes provided by the SDS subsystems 900 and 902 in the compute nodes 706 and 708, respectively, that is associated with their assigned/attached storage device(s)

900*a*-900*c* and 902*a*-902*c*, respectively; and/or any other conventional SDS operations that would be apparent to one of skill in the art in possession of the present disclosure.

As such, following block 802, compute and networking resources in the compute node 706 are configured to provide the SDS subsystem 900 that uses its assigned storage device(s) 900*a*, 900*b*, and 900*c* to provide the SDS system that provides storage for the LCS, and compute and networking resources in the compute node 708 are configured to provide the SDS subsystem 902 that uses its assigned storage device(s) 902*a*, 902*b*, and 902*c* to provide the SDS system that provides storage for the LCS. However, as discussed above, while the specific examples provided herein described the provisioning of an SDS system for an LCS, one of skill in the art in possession of the present disclosure will appreciate how the techniques described herein may be used to provide an SDS system for other non-LCS uses while remaining within the scope of the present disclosure as well.

Figure 10:
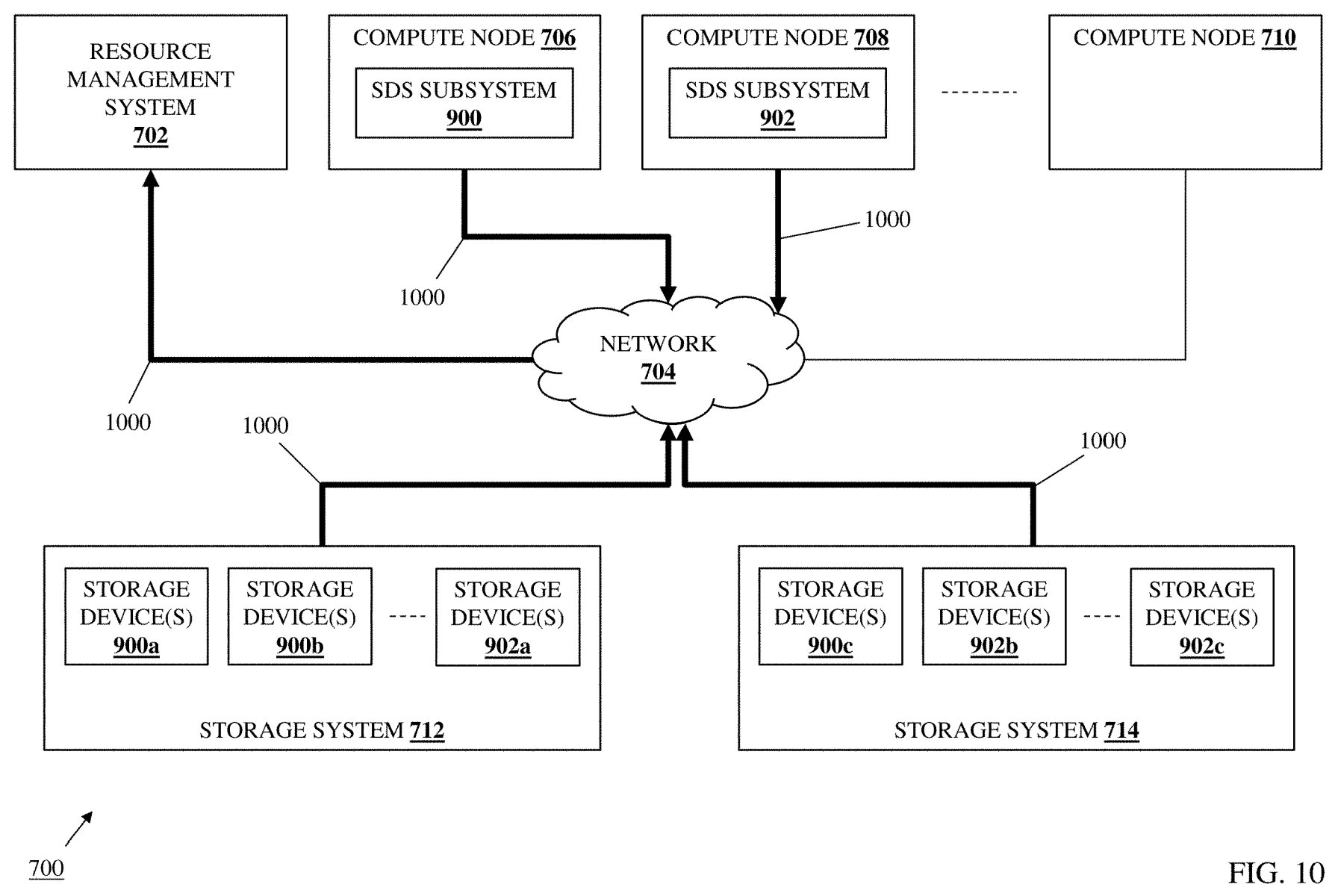

The method 800 then proceeds to decision block 804 where it is determined whether the first subset of resources require adjustment. With reference to FIG. 10 and continuing with the first embodiment of the first specific example of the method 800 in which the compute nodes 706 and 708 are configured with the SDS subsystems 900 and 902, respectively, as described above, in an embodiment of decision block 804 the resource management system 702 may perform resource monitoring operations 1000 that include monitoring each of the compute node 706, the compute node 708, the storage system 712, and the storage system 714.

For example, the resource monitoring operations 1000 may include the SDS subsystem 900 in the compute node 706 transmitting telemetry data via the network 704 to the resource management system 702, and that telemetry data may identify compute resource utilization (e.g., CPU utilization and/or memory utilization) of compute resources in the compute node 706 (e.g., in the server device or an SCP device included in or connected to the server device), networking resource utilization (e.g., networking bandwidth utilization) of networking resources in the compute node 706 (e.g., in the server device or an SCP device included in or connected to the server device), and/or any other resource utilization in the compute node 706 that would be apparent to one of skill in the art in possession of the present disclosure. In response to receiving the telemetry data from the SDS subsystem 900 in the compute node 706, the resource management system 702 may compare any of the compute resource utilization, networking resource utilization, and/or other resource utilization identified therein to any of a variety of compute utilization thresholds, networking utilization thresholds, or other resource utilization thresholds that one of skill in the art in possession of the present disclosure would recognize may be set to indicate when the utilization of resources requires any of the resource adjustments described below.

Similarly, the resource monitoring operations 1000 may include the SDS subsystem 902 in the compute node 708 transmitting telemetry data via the network 704 to the resource management system 702, and that telemetry data may identify compute resource utilization (e.g., CPU utilization and/or memory utilization) of compute resources in the compute node 708 (e.g., in the server device or an SCP device included in or connected to the server device), networking resource utilization (e.g., networking bandwidth utilization) of networking resources in the compute node 708 (e.g., in the server device or an SCP device included in or connected to the server device), and/or any other resource utilization in the compute node 708 that would be apparent to one of skill in the art in possession of the present disclosure. In response to receiving the telemetry data from the SDS subsystem 902 in the compute node 708, the resource management system 702 may compare any of the compute resource utilization, networking resource utilization, and/or other resource utilization identified therein to any of a variety of compute utilization thresholds, networking utilization thresholds, or other resource utilization thresholds that one of skill in the art in possession of the present disclosure would recognize may be set to indicate when the utilization of resources requires any of the resource adjustments described below.

Similarly, the resource monitoring operations 1000 may include the storage system 712 (e.g., an SCP device included in or connected to the storage system 712) transmitting telemetry data via the network 704 to the resource management system 702, and that telemetry data may identify storage resource utilization of storage resources in the storage system 712, networking resource utilization (e.g., networking bandwidth utilization) of networking resources in the storage system 712, and/or any other resource utilization in the storage system 712 that would be apparent to one of skill in the art in possession of the present disclosure. In response to receiving the telemetry data from the storage system 712, the resource management system 702 may compare any of the storage resource utilization, networking resource utilization, and/or other resource utilization identified therein to any of a variety of storage utilization thresholds, networking utilization thresholds, or other resource utilization thresholds that one of skill in the art in possession of the present disclosure would recognize may be set to indicate when the utilization of resources requires any of the resource adjustments described below.

Similarly, the resource monitoring operations 1000 may include the storage system 714 (e.g., an SCP device included in or connected to the storage system 714) transmitting telemetry data via the network 704 to the resource management system 702, and that telemetry data may identify storage resource utilization of storage resources in the storage system 714, networking resource utilization (e.g., networking bandwidth utilization) of networking resources in the storage system 714, and/or any other resource utilization in the storage system 714 that would be apparent to one of skill in the art in possession of the present disclosure. In response to receiving the telemetry data from the storage system 714, the resource management system 702 may compare any of the storage resource utilization, networking resource utilization, and/or other resource utilization identified therein to any of a variety of storage utilization thresholds, networking utilization thresholds, or other resource utilization thresholds that one of skill in the art in possession of the present disclosure would recognize may be set to indicate when the utilization of resources requires any of the resource adjustments described below. Furthermore, one of skill in the art in possession of the present disclosure will appreciate how the utilization thresholds discussed above may be dynamic and may change based on the needs of an LCS or other workload that is being performed by the compute nodes or that is otherwise utilizing the SDS system.

As such, one of skill in the art in possession of the present disclosure will appreciate how the resource management system 702 may monitor the operation of the compute nodes 706 and 708 and the SDS system (which is provided by the SDS subsystems 900 and 902 and the storage systems 712 and 714) in order to determine whether the compute resources, networking resources, storage resources, and/or other resources have reached a utilization threshold that may require any of the adjustments of those resources described below. However, while specific techniques (e.g., telemetry data retrieval) for monitoring compute nodes and an SDS system have been described, one of skill in the art in possession of the present disclosure will appreciate how the compute nodes and SDS system of the present disclosure may be monitored in a variety of manners that will fall within the scope of the present disclosure as well.

If, at decision block 804, it is determined that the first subset of resources do not require adjustment, the method 800 returns to block 802. As such, the method 800 may loop such that the resource management system 702 continues to monitor the resources in the compute node(s) that are providing the SDS system (and the LCS in the specific examples described above) until it determines that those resources require adjustment (e.g., until the utilization of those resources reaches a utilization threshold).

If, at decision block 804, it is determined that the first subset of resources require adjustment, the method 800 proceeds to block 806 where the resource management system identifies a second subset of resources in at least one compute node to provide the SDS system. Continuing with the first embodiment of the first specific example of the method 800 described above with reference to FIG. 9, in an embodiment of decision block 804, the resource management system 702 may determine that one or more resources being utilized in the compute node 706 and/or 708 that are providing the SDS system via the SDS subsystems 900 and 902, respectively, and the storage systems 712 and 714 have reached a utilization threshold.

In this first embodiment of the first specific example of the method 800, the LCS being provided by the compute nodes 706 and 708 (which are also providing the SDS system that provides storage for that LCS) may require additional compute resources, which may be determined by the resource management system 702 via the dynamic setting of a utilization threshold that is exceeded by the compute nodes 706 and 708 at decision block 804, although one of skill in the art in possession of the present disclosure will appreciate how the requirement for additional compute resources (or other resources) provided by compute nodes may be identified in a variety of manners that will fall within the scope of the present disclosure as well. Continuing with this first embodiment of the first specific example of the method 800, in an embodiment of block 806 and in response to determining that the compute resources provided by the compute nodes 706 and 708 require adjustment at decision block 804, the resource management system 702 may identify the compute node 710 as including available compute resources that will satisfy the requirements of the LCS that is currently being provided by the compute nodes 706 and 708.

Figure 11:
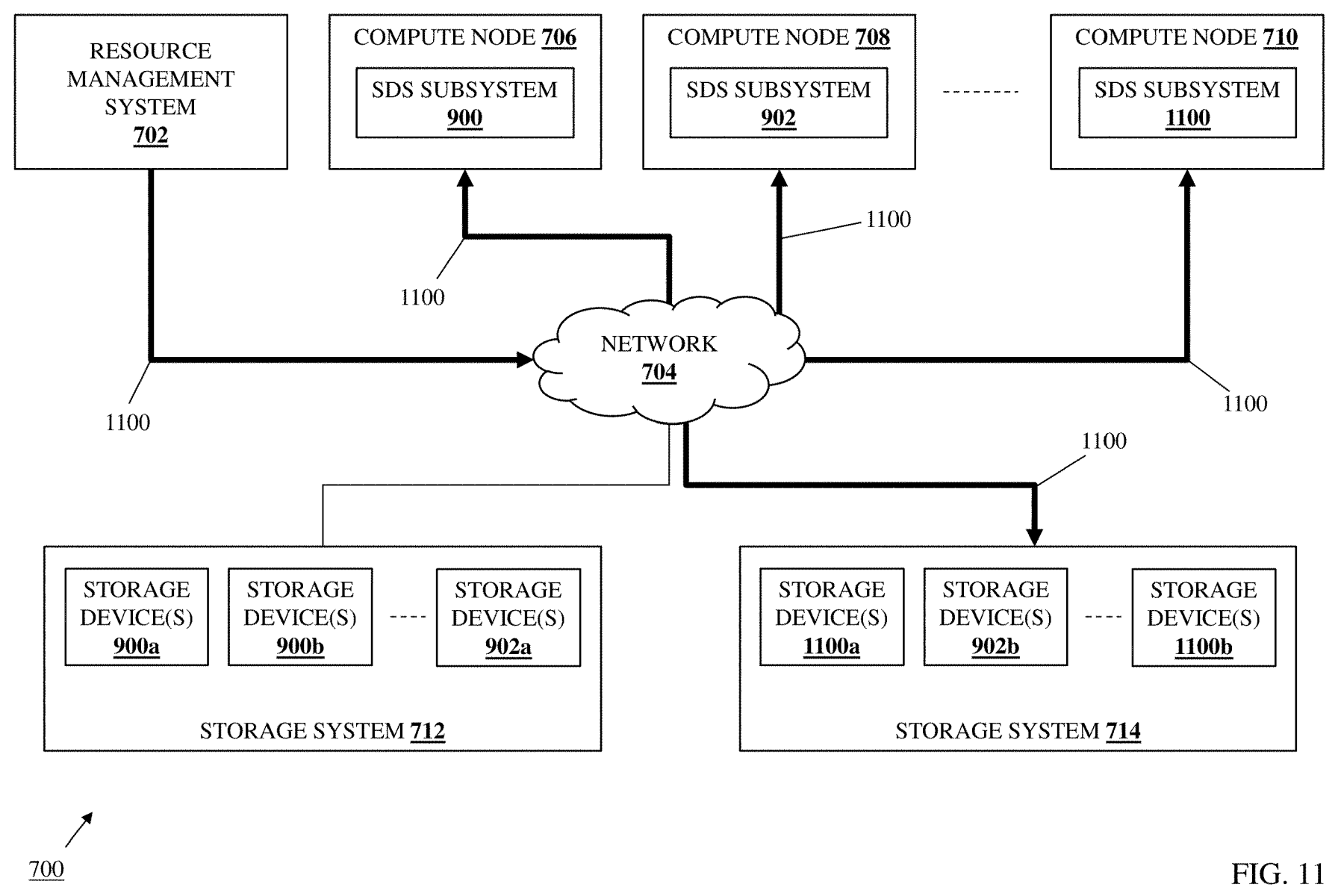

The method 800 then proceeds to block 808 where the resource management system reassigns at least one of the storage devices from at least one of the first subset of resources to at least one of the second subset of resources. In an embodiment, at block 808 and in response to identifying a second subset of resources in at least one compute node to provide the SDS system at block 806, the resource management system 702 may configure that second subset of resources to provide the SDS system. With reference to FIG. 11, and continuing with the first embodiment of the first specific example of the method 800 in which the compute node 710 was identified as including available compute resources that will satisfy the requirements of the LCS that is currently being provided by the compute nodes 706 and 708 at block 806, at block 808 the resource management system 702 may perform SDS configuration operations 1100 that include reassigning storage devices in the storage systems 712 and 714 from resources in the compute nodes 706 and 708 to resources in the compute node 710.

For example, the SDS configuration operations 1100 may include the resource management system 702 configuring the compute node 710 to provide an SDS subsystem 1100 that operates as a "storage node" using storage resources provided by the storage device(s) 714a and 714c in the storage system 714 (as indicated by the renumbering of the storage device(s) 714a and 714c in FIG. 7 to storage device(s) 1100a and 1100b, respectively, in FIG. 11), which one of skill in the art in possession of the present disclosure will recognize reassigns the storage device(s) 714a in the storage system 714 from the SDS subsystem 900 provided by the compute node 706 to the SDS subsystem 1100 provided by the compute node 710 (as indicated by the renumbering in of the storage device(s) 900c in FIG. 9 to storage device(s) 1100a in FIG. 11), and reassigns the storage device(s) 714c in the storage system 714 from the SDS subsystem 902 provided by the compute node 708 to the SDS subsystem 1100 provided by the compute node 710 (as indicated by the renumbering of the storage device(s) 902c in FIG. 9 to storage device(s) 1100b in FIG. 11).

In a specific example, the SDS configuration operations 1100 performed at block 808 may include SDS storage node composition operations that compose the storage node provided by the SDS subsystem 1100 in the compute node 710 as described above, followed by SDS storage cluster addition operations that add that storage node provided by the SDS subsystem 1100 in the compute node 710 to the storage cluster provided by the storage nodes provided by the SDS subsystems 900 and 902 in compute nodes 706 and 708, respectively. The SDS configuration operations 1100 may then include SDS storage device reassignment identification operations that identify the storage device(s) 714a and 714c in the storage system 714 used by the storage nodes provided by the SDS subsystems 900 and 902, respectively, in the compute nodes 706 and 708, respectively, for reassignment to the storage node provided by the SDS subsystem 1100 in the compute node 710, followed by SDS storage device attachment operations that attach those storage device(s) 714a and 714c identified for reassignment to the storage node provided by the SDS subsystem 1100 in the compute node 710 (as indicated by the renumbering of the storage device(s) 714a/900c in FIGS. 7 and 9 to storage device(s) 1100a in FIG. 11, and the renumbering of the storage device(s) 714c/902c in FIGS. 7 and 9 to storage device(s) 1100b in FIG. 11).

The SDS configuration operations 1100 may then include automatic recovery suspension operations that configure the storage cluster provided by the storage nodes provided by the SDS subsystems 900 and 902 in compute nodes 706 and 708, respectively, to suspend automatic data recovery operations, which one of skill in the art in possession of the present disclosure will appreciate will prevent the subsequent removal of any storage device(s) from those storage node(s) from causing the storage cluster to interpret that storage device removal as a storage device failure that results in the performance of corresponding data recovery operations (e.g., data replication operations).

The SDS configuration operations 1100 may then include metadata updating operations that update metadata in the SDS subsystem 900 to remove its ownership of the storage device(s) 714a, update metadata in the SDS subsystem 902 to remove its ownership of the storage device(s) 714c, and update metadata in the SDS subsystem 1100 to add its ownership of the storage device(s) 714a and 714c (as indicated by the renumbering of the storage device(s) 714a/900c in FIGS. 7 and 9 to storage device(s) 1100a in FIG. 11, and the renumbering of the storage device(s) 714c/902c in FIGS. 7 and 9 to storage device(s) 1100b in FIG. 11). The SDS configuration operations 1100 may then include storage device removal operations that remove the storage device(s) 714a from the storage node provided by SDS subsystem 900 in the compute node 706, and remove the storage device(s) 714c from the storage node provided by the SDS subsystem 902 in the compute node 708. Finally, the SDS configuration operations 1100 may then include storage cluster resumption operations that resume operation of the storage cluster provided by the storage nodes provided by the SDS subsystems 900, 902, and 1100 in compute nodes 706, 708, and 710, respectively (e.g., while also resuming the automatic data recovery operations discussed above).

The method 800 then proceeds to block 810 where the resource management system provides the SDS system using the at least one of the second subset of resources. In an embodiment, at block 810 and following completion of the SDS configuration operations 1100 at block 808, the SDS subsystems 900. 902, and 1100 in the compute nodes 706, 708, and 710, respectively, may be used to provide the SDS system using the same storage devices that were previously being used by the SDS subsystems 900 and 902 in the compute nodes 706 and 708, respectively. For example, at block 810, compute and networking resources in the compute node 706 are configured to provide the SDS subsystem 900 that uses its assigned storage device(s) 900a and 900b to provide the SDS system that provides storage for the LCS, compute and networking resources in the compute node 708 are configured to provide the SDS subsystem 902 that uses its assigned storage device(s) 902a and 902b to provide the SDS system that provides storage for the LCS, and compute and networking resources in the compute node 710 are configured to provide the SDS subsystem 1100 that uses its assigned storage device(s) 1100a and 1100b to provide the SDS system that provides storage for the LCS.

One of skill in the art in possession of the present disclosure will appreciate how the addition of the compute node 710 for use with the compute nodes 706 and 708 in order to provide the LCS will increase the available compute resources required by the LCS in this example, thus allowing the compute resources provided for the LCS to be scaled up while the storage resources provided for the LCS remain the same (which one of skill in the art in possession of the present disclosure will appreciate avoids the need for costly data migrations in conventional systems with static compute resource/storage resource assignments/attachments). Furthermore, while the scaling up of compute resources while provisioning the same storage resources in an SDS system has been described, one of skill in the art in possession of the present disclosure will appreciate how networking resource or other resources (or any combinations of compute resources, networking resources, and other resources) may be scaled up while provisioning the same storage resources in an SDS system similarly as described above while remaining within the scope of the present disclosure.

While an example of providing of adding compute resources while maintaining storage resources in an SDS system has been described, one of skill in the art in possession of the present disclosure will appreciate how compute resource may be modified while maintaining storage resources in an SDS system in a variety of manners that will fall within the scope of the present disclosure, a few specific examples of which are described in further detail below.

To provide a second specific example of the method 800, block 802 may operate to configure the compute nodes 706, 708, and 710 similarly as they are configured following the first example of the method 800, with the compute node 706 providing the SDS subsystem 900 that operates as the "storage node" using storage resources provided by the storage device(s) 712a/900a and 712b/900b in the storage system 712, the compute node 708 providing the SDS subsystem 902 that operates as the "storage node" using storage resources provided by the storage device(s) 712c/902a in the storage system 712 and the storage device(s) 714b/902b in the storage system 714, and the compute node 710 providing the SDS subsystem 1100 that operates as the "storage node" using storage resources provided by the storage device(s) 714a/1100a and 714c/1100b in the storage system 714. As such, block 802 in this second specific example of the method 800 may be performed via blocks 802-810 of the first embodiment of the first specific example of the method 800, but with the "first" and "second" resources at the end of the first embodiment of the first specific example of the method 800 becoming the "first" resources at the beginning of the second specific example of the method 800. However, one of skill in the art in possession of the present disclosure will appreciate how the configuration provided at block 802 for this second specific example of the method 800 may be an initial configuration performed similarly as described above with regard to block 802 for the first embodiment of the first specific example of the method 800 while remaining within the scope of the present disclosure as well.

Figure 12:
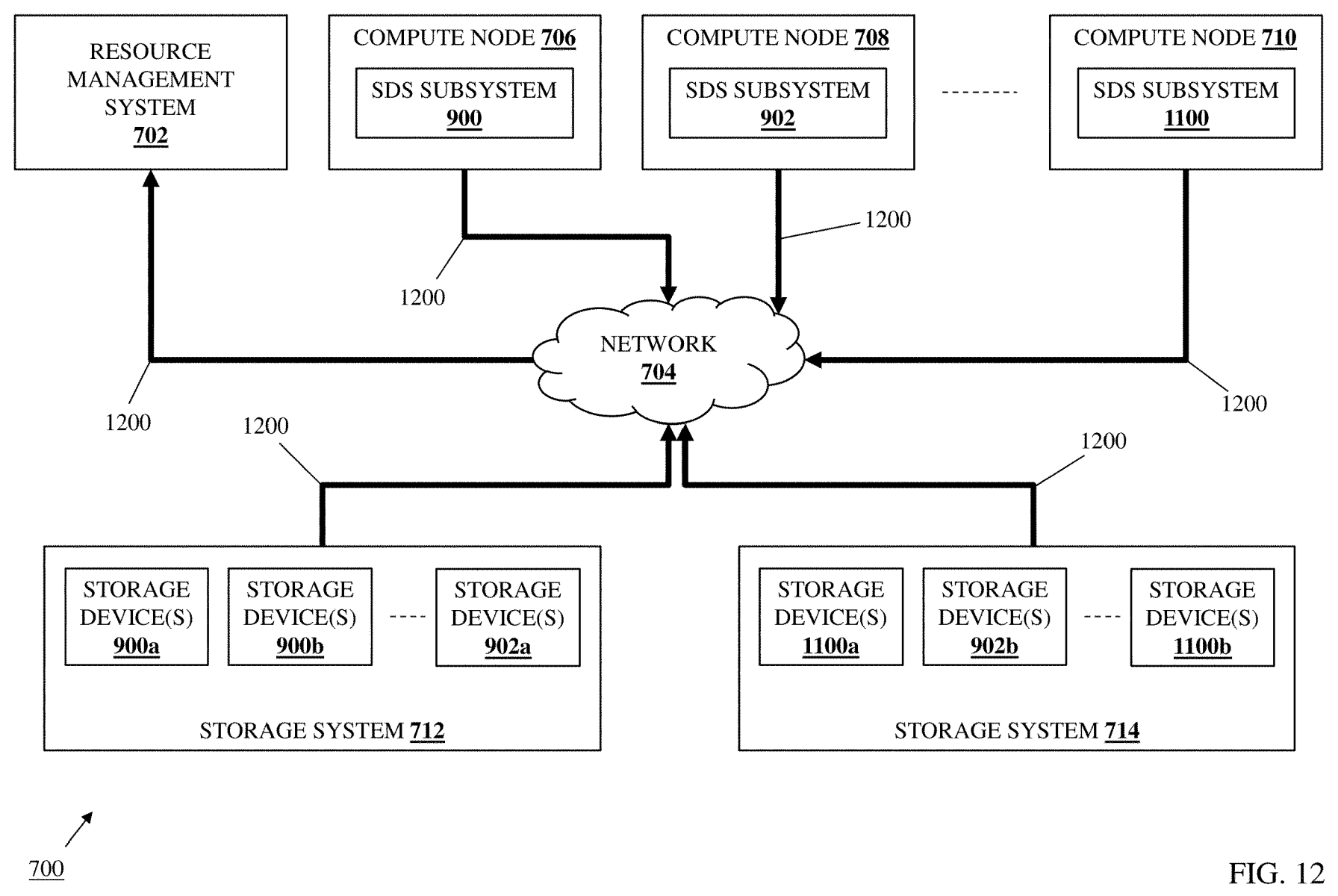

Similarly as described above, the method 800 then proceeds to decision block 804 where it is determined whether the first subset of resources require adjustment. With reference to FIG. 12 and continuing with the second specific example of the method 800 in which the compute nodes 706, 708, and 710 are configured with the SDS subsystems 900, 902, and 1100, respectively, in an embodiment of decision block 804 the resource management system 702 may perform resource monitoring operations 1200 that include monitoring each of the compute node 706, the compute node 708, the compute node 1100, the storage system 712, and the storage system 714. As will be appreciated by one of skill in the art in possession of the present disclosure, the resource monitoring operations 1200 may be substantially similar to the resource monitoring operations 1000 discussed above that include monitoring each of the compute node 706, the compute node 708, the storage system 712, and the storage system 714 at decision block 804 of the first embodiment of the first specific example of the method 800.

However, the resource monitoring operations 1200 at decision block 804 of this second specific example of the method 800 may also include the SDS subsystem 1100 in the compute node 710 transmitting telemetry data via the network 704 to the resource management system 702, and that telemetry data may identify compute resource utilization (e.g., CPU utilization and/or memory utilization) of compute resources in the compute node 710 (e.g., in the server device or an SCP included in or connected to the server device), networking resource utilization (e.g., networking bandwidth utilization) of networking resources in the compute node 710 (e.g., in the server device or an SCP included in or connected to the server device), and/or any other resource utilization in the compute node 710 that would be apparent to one of skill in the art in possession of the present disclosure. In response to receiving the telemetry data from the SDS subsystem 1100 in the compute node 710, the resource management system 702 may compare any of the compute resource utilization, networking resource utilization, and/or other resource utilization identified therein to any of a variety of compute utilization thresholds, networking utilization thresholds, or other resource utilization thresholds that one of skill in the art in possession of the present disclosure would recognize may be set to indicate when the utilization of resources requires any of the resource adjustments described below.

As such, one of skill in the art in possession of the present disclosure will appreciate how the resource management system 702 may monitor the operation of the compute nodes 706, 708, and 710 and the SDS system provided by the SDS subsystems 900, 902, and 1100 and the storage systems 712 and 714 to determine whether the compute resources, networking resources, storage resources, and/or other resources have reached a utilization threshold that requires any of the adjustments of those resources described below. Similarly as described above, if at decision block 804 it is determined that the first subset of resources do not require adjustment, the method 800 returns to block 802. As such, the method 800 may loop such that the resource management system 702 continues to monitor the resources in the compute node(s) that are providing the SDS system (and the LCS in the specific examples described above) until it determines that those resources require adjustment (e.g., until the utilization of those resources reaches a utilization threshold).

If, at decision block 804, it is determined that the first subset of resources require adjustment, the method 800 proceeds to block 806 where the resource management system identifies a second subset of resources in at least one compute node to provide the SDS system. Continuing with the second specific example of the method 800, in an embodiment of decision block 804, the resource management system 702 may determine that one or more resources being utilized in the compute nodes 706, 708, and/or 710 that are providing the SDS system via the SDS subsystems 900, 902, and 1100, respectively, and the storage systems 712 and 714 have reached a utilization threshold.

In this second specific example of the method 800, the LCS being provided by the compute nodes 706, 708, and 710 (which also provide the SDS system that provides storage for that LCS) may require fewer compute resources, which may be determined by the resource management system 702 via the dynamic setting of a utilization threshold below which the compute nodes 706, 708, and 710 fall at decision block 804, although one of skill in the art in possession of the present disclosure will appreciate how the requirement for fewer compute resources (or other resources) provided by compute nodes may be identified in a variety of manners that will fall within the scope of the present disclosure as well. Continuing with this second specific example of the method 800, in an embodiment of block 806 and in response to determining that the compute resources provided by the compute nodes 706, 708, and 710 require adjustment at decision block 804, the resource management system 702 may identify the compute node 708 as including compute resources that may be removed from the LCS while still satisfying the requirements of the LCS that is currently being provided by the compute nodes 706, 708, and 710.

Figure 13:
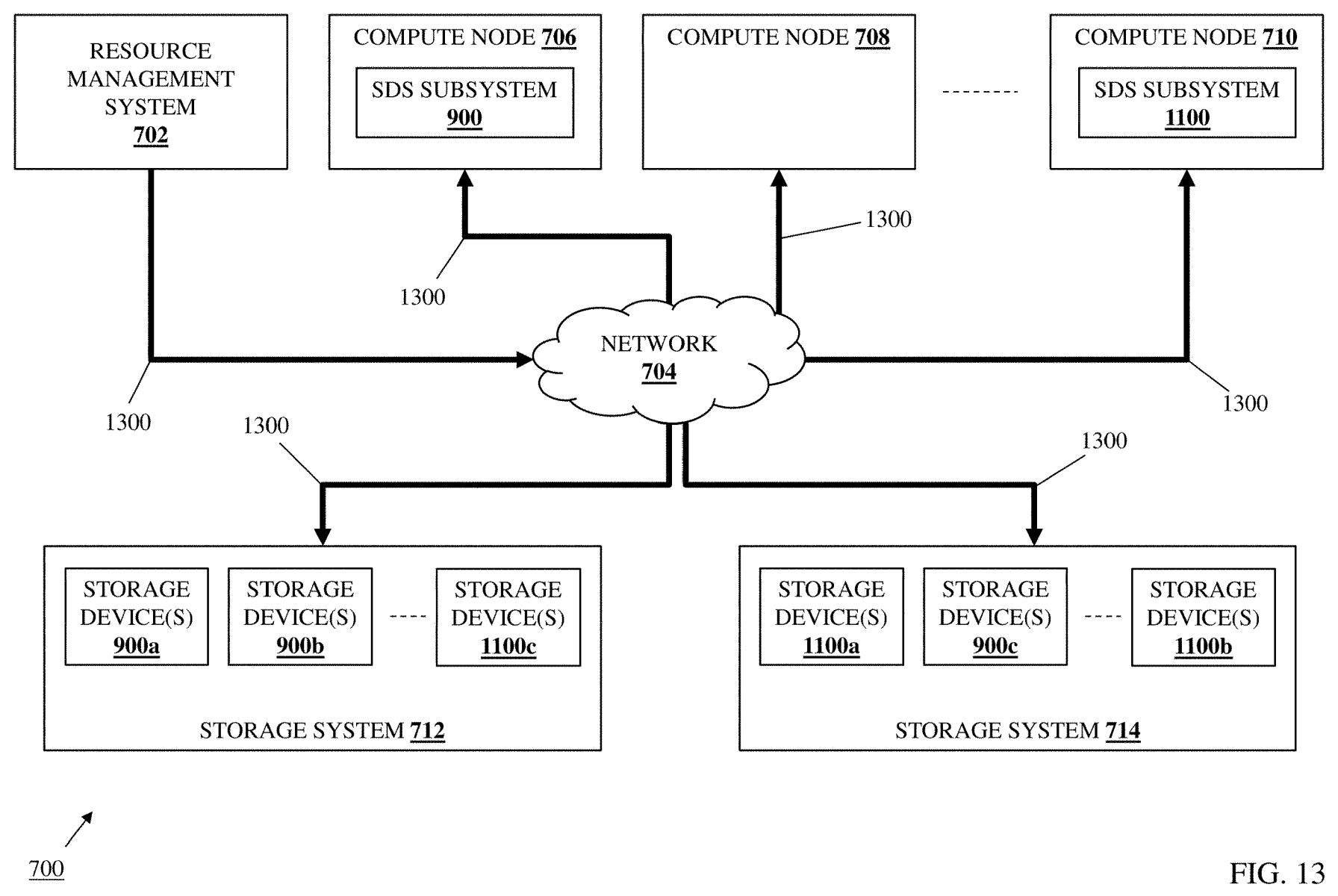

The method 800 then proceeds to block 808 where the resource management system reassigns at least one of the storage devices from at least one of the first subset of resources to at least one of the second subset of resources. In an embodiment, at block 808 and in response to identifying a second subset of resources in at least one compute node to provide the SDS system at block 806, the resource management system 702 may configure that second subset of resources to provide the SDS system. With reference to FIG. 13, and continuing with the second specific example of the method 800 in which the compute node 708 was identified as including compute resources that may be removed from the LCS while still satisfying the requirements of the LCS that is currently being provided by the compute nodes 706, 708, and 710 at block 806, at block 808 the resource management system 702 may perform SDS configuration operations 1300 that include reassigning storage devices in the storage systems 712 and 714 from resources in the compute node 708 to resources in the compute nodes 706 and 710, and removing the compute node 708 from providing the LCS and SDS system.

For example, the SDS configuration operations 1300 may include the resource management system 702 reassigning the storage device(s) 712c in the storage system 712 from the SDS subsystem 902 provided by the compute node 708 to the SDS subsystem 1100 provided by the compute node 710 (as indicated by the renumbering of the storage device(s) 902a in FIG. 9 to storage device(s) 1100c in FIG. 13), and reassigning the storage device(s) 714b in the storage system 714 from the SDS subsystem 902 provided by the compute node 708 to the SDS subsystem 900 provided by the compute node 706 (as indicated by the renumbering of the storage device(s) 902b in FIG. 9 to storage device(s) 900c in FIG. 13).

In a specific example, the SDS configuration operations 1300 performed at block 808 may include SDS storage node removal/storage device reassignment identification operations that identify the storage node provided by the SDS subsystem 902 in the compute node 708 for removal from the storage cluster provided by the storage nodes provided by the SDS subsystems 900, 902, and 1100 in the compute nodes 706, 708, and 710, respectively, as described above; as well as the identification of its storage device(s) 712c/902a and 714b/902b in the storage systems 712 and 714, respectively, for reassignment to the storage nodes provided by the SDS subsystems 1100 and 900 in the compute nodes 710 and 706, respectively; followed by SDS storage device attachment operations that attach the storage device(s) 712c identified for reassignment to the storage node provided by the SDS subsystem 1100 in the compute node 710 (as indicated by the renumbering of the storage device(s) 712c/902a in FIGS. 7 and 9 to storage device(s) 1100c in FIG. 13, and that attach the storage device(s) 714b identified for reassignment to the storage node provided by the SDS subsystem 900 in the compute node 706 (as indicated by the renumbering of the storage device(s) 714b/902b in FIGS. 7 and 9 to storage device(s) 900c in FIG. 13).

The SDS configuration operations 1300 may then include automatic recovery suspension operations that configure the storage cluster provided by the storage nodes provided by the SDS subsystems 900, 902, and 1100 in the compute nodes 706, 708, and 710, respectively, to suspend automatic data recovery operations, which one of skill in the art in possession of the present disclosure will appreciate prevents the subsequent removal of storage device(s) from the storage node(s) from causing the storage cluster to interpret that storage device removal as a storage device failure and perform corresponding data recovery operations (e.g., data replication operations).

The SDS configuration operations 1300 may then include metadata updating operations that update metadata in the SDS subsystem 900 to add its ownership of the storage device(s) 714*b*/900*c*, update metadata in the SDS subsystem 1100 to add its ownership of the storage device(s) 712*c*/1100*c*, and update metadata in the SDS subsystem 902 to remove its ownership of the storage device(s) 712*c*/902*a* and 714*b*/902*b*. The SDS configuration operations 1300 may then include storage device removal operations that remove the storage device(s) 712*c*/902*a* and 714*b*/902*b* from the storage node provided by the SDS subsystem 902 in the compute node 708, followed by storage node removal operations that remove the SDS subsystem 902 from the compute node 708 to remove its storage node from the storage cluster provided by the storage nodes provided by the SDS subsystems 900 and 1100 in the compute nodes 706 and 710, respectively. Finally, the SDS configuration operations 1300 may then include storage cluster resumption operations that resume operation of the storage cluster provided by the storage nodes provided by the SDS subsystems 900 and 1100 in the compute nodes 706 and 710, respectively (e.g., while also resuming the automatic data recovery operations discussed above).

The method 800 then proceeds to block 810 where the resource management system provides the SDS system using the at least one of the second subset of resources. In an embodiment, at block 810 and following completion of the SDS configuration operations 1300 at block 808, the SDS subsystems 900 and 1100 in the compute nodes 706 and 710, respectively, may be used to provide the SDS system using the same storage devices that were previously being used by the SDS subsystems 900, 902, and 1100 in the compute nodes 706, 708, and 710, respectively. For example, at block 810, compute and networking resources in the compute node 706 are configured to provide the SDS subsystem 900 that uses its assigned storage device(s) 900*a*, 900*b*, and 900*c* to provide the SDS system that provides storage for the LCS, and compute and networking resources in the compute node 710 are configured to provide the SDS subsystem 1100 that uses its assigned storage device(s) 1100*a*, 1100*b*, and 1100*c* to provide the SDS system that provides storage for the LCS.

Furthermore, one of skill in the art in possession of the present disclosure will appreciate how the removal of the compute node 708 to use only the compute nodes 706 and 710 in order to provide the LCS will decrease the available compute resources required by the LCS in this example, thus allowing the compute resources provided for the LCS to be scaled down while the storage resources provided for the LCS remain the same (which one of skill in the art in possession of the present disclosure will appreciate avoids the need for the costly data migrations that are required in the conventional systems discussed above with static compute resource/storage resource assignments/attachments). Furthermore, while the scaling down of compute resources while provisioning the same storage resources in an SDS system has been described, one of skill in the art in possession of the present disclosure will appreciate how networking resource or other resources (or any combinations of compute resources, networking resources, and other resources) may be scaled down while provisioning the same storage resources in an SDS system similarly as described above while remaining within the scope of the present disclosure.

To provide a second embodiment of the first specific example of the method 800 discussed above with reference to FIG. 9, at decision block 804 the LCS being provided by the compute nodes 706 and 708 (which also provide the SDS system to provide storage for that LCS) may require different compute resources, which may be determined by the resource management system 702 via the dynamic setting of a utilization threshold that the compute nodes 706 and 708 may exceed or fall below at decision block 804, although one of skill in the art in possession of the present disclosure will appreciate how the requirement for additional or fewer compute resources (or other resources) provided by compute nodes may be identified in a variety of manners that will fall within the scope of the present disclosure as well. Continuing with this second embodiment of the first specific example of the method 800, in an embodiment of block 806 and in response to determining that the compute resources provided by the compute nodes 706 and 708 require adjustment at decision block 804, the resource management system 702 may identify the compute node 710 as including available compute resources that should replace the compute resources in the compute node 708 in order to satisfy the requirements of the LCS that is currently being provided by the compute nodes 706 and 708.

Figure 14:
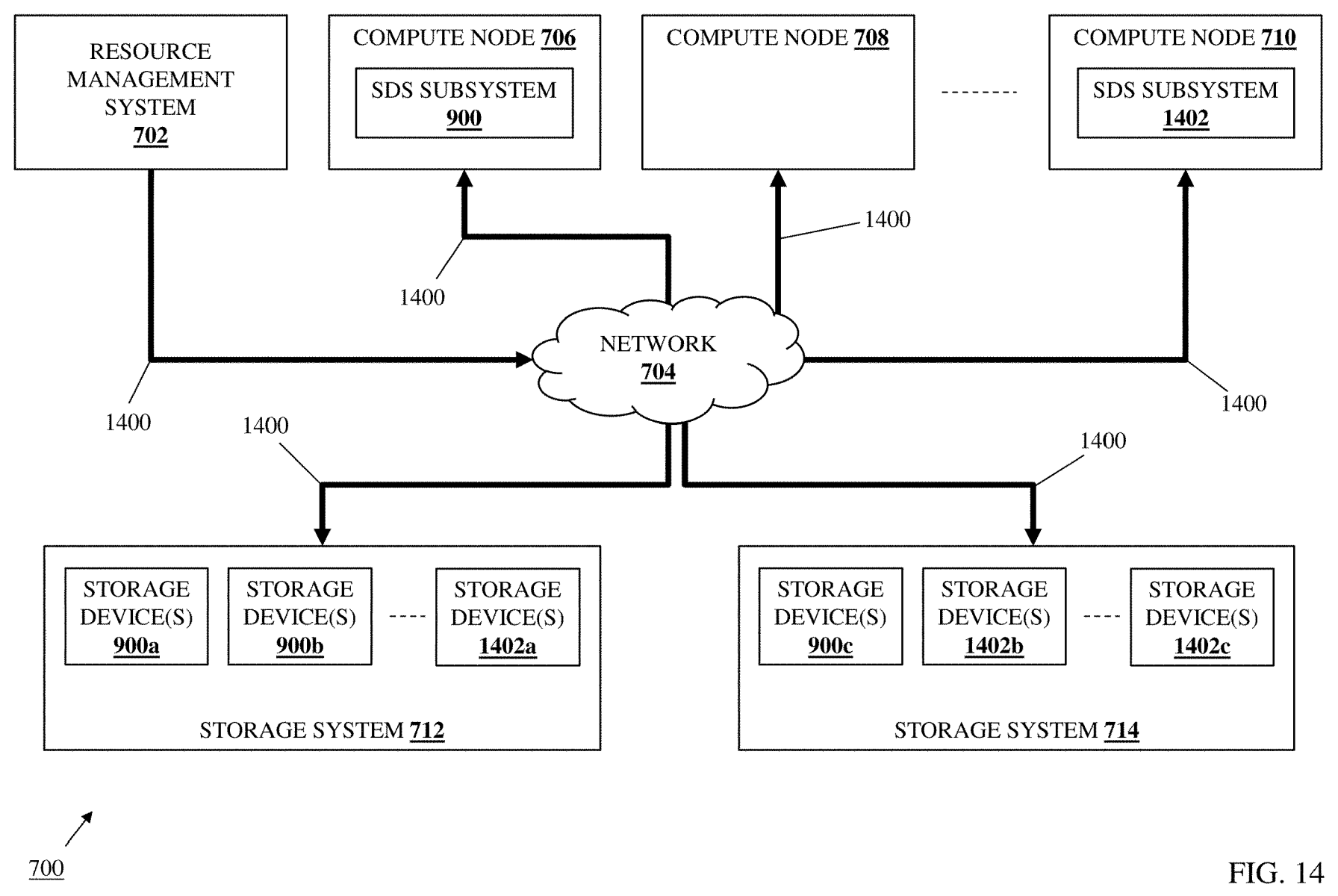

The method 800 then proceeds to block 808 where the resource management system reassigns at least one of the storage devices from at least one of the first subset of resources to at least one of the second subset of resources. In an embodiment, at block 808 and in response to identifying a second subset of resources in at least one compute node to provide the SDS system at block 806, the resource management system 702 may configure that second subset of resources to provide the SDS system. With reference to FIG. 14, and continuing with this second embodiment of the first specific example of the method 800 in which the compute node 710 was identified as including available compute resources that should replace the compute resources in the compute node 708 in order to satisfy the requirements of the LCS that is currently being provided by the compute nodes 706 and 708 at block 806, at block 808 the resource management system 702 may perform SDS configuration operations 1400 that include reassigning storage devices in the storage systems 712 and 714 from resources in the compute node 708 to resources in the compute node 710.

For example, the SDS configuration operations 1400 may include the resource management system 702 configuring the compute node 710 to provide an SDS subsystem 1402 that operates as a "storage node" using storage resources provided by the storage device(s) 712*c* in the storage system 712 (as indicated by the renumbering of the storage device(s) 712*c* in FIG. 7 to storage device(s) 1402*a* in FIG. 14) and the storage device(s) 714*b* and 714*c* in the storage system 714 (as indicated by the renumbering of the storage device(s) 714*b* and 714*c* in FIG. 7 to storage device(s) 1402*b* and 1402*c* in FIG. 14), which one of skill in the art in possession of the present disclosure will recognize reassigns the storage device(s) 712*c* in the storage system 712 from the SDS subsystem 902 provided by the compute node 708 to the SDS subsystem 1402 provided by the compute node 710 (as indicated by the renumbering of the storage device(s) 902*a* in FIG. 9 to storage device(s) 1402*a* in FIG. 14), and reassigns the storage device(s) 714*b* and 714*c* in the storage system 714 from the SDS subsystem 902 provided by the compute node 708 to the SDS subsystem 1402 provided by the compute node 710 (as indicated by the renumbering of the storage device(s) 902*b* and 902*c* in FIG. 9 to storage device(s) 1402*b* and 1402*c* in FIG. 14).

In a specific example, the SDS configuration operations 1400 performed at block 808 may include SDS storage node composition operations that compose the storage node provided by the SDS subsystem 1402 in the compute node 710 as described above, followed by SDS storage cluster addition operations that add that storage node provided by the SDS subsystem 1402 in the compute node 710 to the storage cluster provided by the storage nodes provided by the SDS subsystems 900 and 902 in compute nodes 706 and 708, respectively. The SDS configuration operations 1400 may then include SDS storage device reassignment identification operations that identify the storage device(s) 712c, 714b, and 714c in the storage systems 712 and 714 used by the storage node provided by the SDS subsystem 902 in compute node 708, respectively, for resassignment to the storage node provided by the SDS subsystem 1402 in the compute node 710, followed by SDS storage device attachment operations that attach those storage device(s) 712c, 714b, and 714c identified for reassignment to the storage node provided by the SDS subsystem 1402 in the compute node 710 (as indicated by the renumbering of the storage device(s) 902a, 902b, and 902c in FIG. 9 to storage device(s) 1402a, 1402b, and 1402c, respectively, in FIG. 14).

The SDS configuration operations 1400 may then include automatic recovery suspension operations that configure the storage cluster provided by the storage nodes provided by the SDS subsystems 900 and 902 in the compute nodes 706 and 708, respectively, to suspend automatic data recovery operations, which one of skill in the art in possession of the present disclosure will appreciate prevents the subsequent removal of storage device(s) from those storage node(s) from causing the storage cluster to interpret that storage device removal as a storage device failure and perform corresponding data recovery operations (e.g., data replication operations).

The SDS configuration operations 1400 may then include metadata updating operations that update metadata in the SDS subsystem 902 to remove its ownership of the storage device(s) 712c, 714b, and 714c, and update metadata in the SDS subsystem 1402 to add its ownership of the storage device(s) 712c, 714b, and 714c. The SDS configuration operations 1400 may then include storage device removal operations that remove the storage device(s) 712c, 714b, and 714c from the storage node provided by the SDS subsystem 902 in the compute node 708. Finally, the SDS configuration operations 1400 may then include storage cluster resumption operations that resume operation of the storage cluster provided by the storage nodes provided by the SDS subsystem 900 and 1402 in compute nodes 706 and 710, respectively (e.g., while also resuming the automatic data recovery operations discussed above).

The method 800 then proceeds to block 810 where the resource management system provides the SDS system using the at least one of the second subset of resources. In an embodiment, at block 810 and following completion of the SDS configuration operations 1400 at block 808, the SDS subsystems 900 and 1402 in the compute nodes 706 and 710, respectively, may be used to provide the SDS system using the same storage devices that were previously being used by the SDS subsystems 900 and 902 in the compute nodes 706 and 708, respectively. For example, at block 810, compute and networking resources in the compute node 706 are configured to provide the SDS subsystem 900 that uses its assigned storage device(s) 900a, 900b, and 900c to provide the SDS system that provides storage for the LCS, and compute and networking resources in the compute node 710 are configured to provide the SDS subsystem 1402 that uses its assigned storage device(s) 1402a, 1402b, and 1402c to provide the SDS system that provides storage for the LCS.

Furthermore, one of skill in the art in possession of the present disclosure will appreciate how the replacement of the use of the compute node 708 with the compute node 710 in order to provide the LCS may increase or decrease the available compute resources required by the LCS in this example, thus allowing the compute resources provided for the LCS to be scaled up or down while the storage resources provided for the LCS remain the same (which one of skill in the art in possession of the present disclosure will appreciate avoids the need for the costly data migrations that are required in the conventional systems discussed above with static compute resource/storage resource assignments/attachments). Furthermore, while the scaling up or down of compute resources while provisioning the same storage resources in an SDS system has been described, one of skill in the art in possession of the present disclosure will appreciate how networking resource or other resources (or any combinations of compute resources, networking resources, and other resources) may be scaled up or down while provisioning the same storage resources in an SDS system similarly as described above while remaining within the scope of the present disclosure.

To provide a third embodiment of the first specific example of the method 800 discussed above with reference to FIG. 9, at decision block 804 the LCS being provided by the compute nodes 706 and 708 (which also provide the SDS system to provide storage for that LCS) may require different compute resources, which may be determined by the resource management system 702 via the dynamic setting of a utilization threshold that the compute nodes 706 and 708 may exceed or fall below at decision block 804, although one of skill in the art in possession of the present disclosure will appreciate how the requirement for additional or fewer compute resources (or other resources) provided by compute nodes may be identified in a variety of manners that will fall within the scope of the present disclosure as well. Continuing with this third embodiment of the first specific example of the method 800, in an embodiment of block 806 and in response to determining that the compute resources provided by the compute nodes 706 and 708 require adjustment at decision block 804, the resource management system 702 may identify different compute resources (e.g., a different number of cores, an accelerator device, etc.) in the compute node 708 as including "new" compute resources that should replace at least some of the "original" compute resources in the compute node 708 that were configured to provide the SDS subsystem 902 at block 802 in order to satisfy the requirements of the LCS that is currently being provided by the compute nodes 706 and 708.

Figure 15:
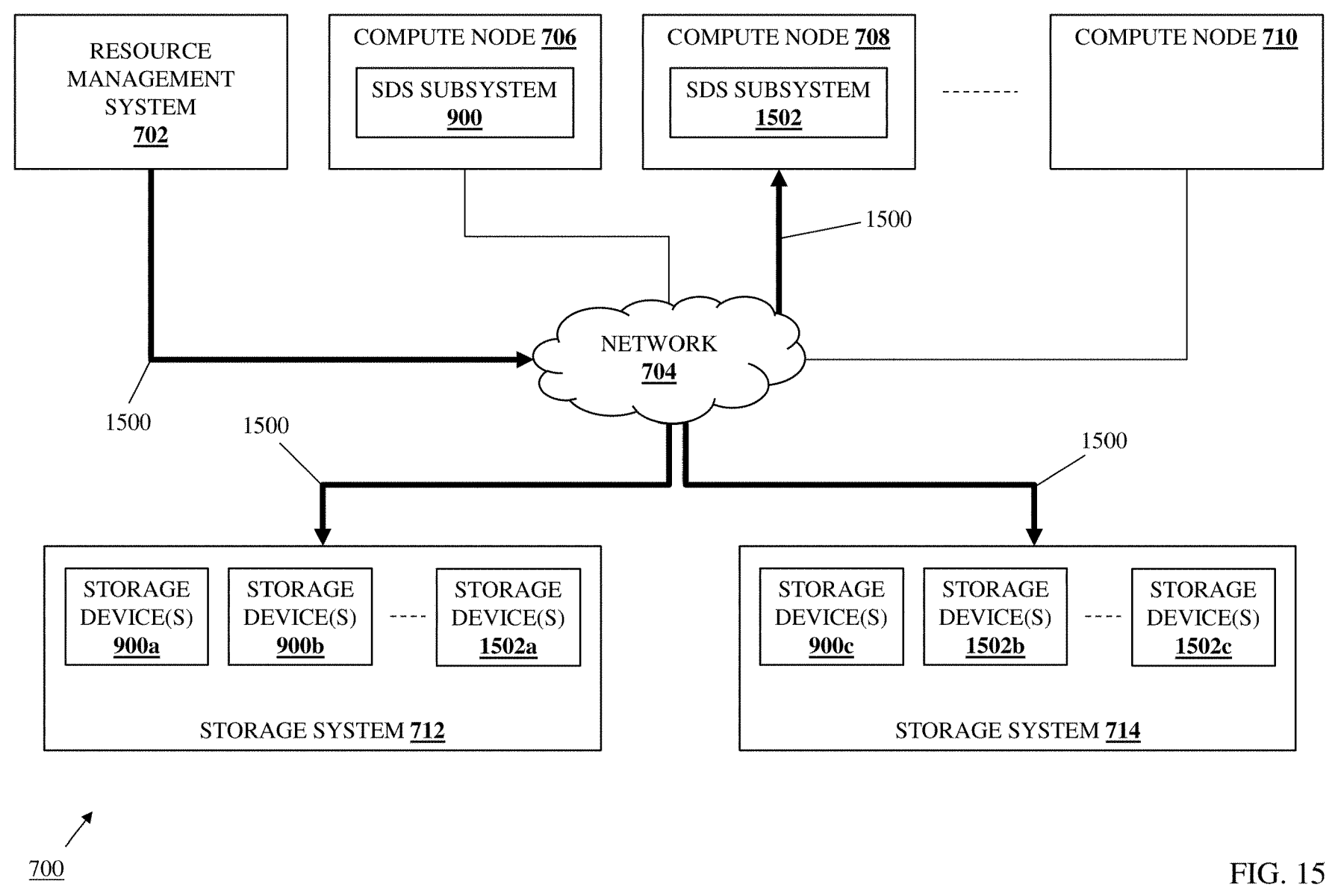

The method 800 then proceeds to block 808 where the resource management system reassigns at least one of the storage devices from at least one of the first subset of resources to at least one of the second subset of resources. In an embodiment, at block 808 and in response to identifying a second subset of resources in at least one compute node to provide the SDS system at block 806, the resource management system 702 may configure that second subset of resources to provide the SDS system. With reference to FIG. 15, and continuing with this third embodiment of the first specific example of the method 800 in which "new" compute resources in the compute node 708 are identified that should replace at least some of the "original" compute resources in the compute node 708 that were configured to provide the SDS subsystem 902 at block 802 in order to satisfy the requirements of the LCS that is currently being provided by the compute nodes 706 and 708 at block 806, at block 808 the resource management system 702 may perform SDS configuration operations 1500 that include reassigning storage devices in the storage systems 712 and 714 from at least some of the "original" compute resources in the compute node 708 to the "new" compute resources in the compute node 708.

For example, the SDS configuration operations 1500 may include the resource management system 702 configuring the "new" compute resources in the compute node 708 to provide an SDS subsystem 1502 that operates as a "storage node" using storage resources provided by the storage device(s) 712c in the storage system 712 (as indicated by the renumbering of the storage device(s) 712c in FIG. 7 to storage device(s) 1502a in FIG. 15) and the storage device(s) 714b and 714c in the storage system 714 (as indicated by the renumbering of the storage device(s) 714b and 714c in FIG. 7 to storage device(s) 1502b and 1502c in FIG. 15), which one of skill in the art in possession of the present disclosure will recognize reassigns the storage device(s) 712c in the storage system 712 from at least some of the "old" compute resources used by the SDS subsystem 902 provided by the compute node 708 to the SDS subsystem 1502 provided by the compute node 708 (as indicated by the renumbering of the storage device(s) 902a in FIG. 9 to storage device(s) 1502a in FIG. 15), and reassigns the storage device(s) 714b and 714c in the storage system 714 from at least some of the "old" compute resources used by the SDS subsystem 902 provided by the compute node 708 to the SDS subsystem 1502 provided by the compute node 708 (as indicated by the renumbering of the storage device(s) 902b and 902c in FIG. 9 to storage device(s) 1502b and 1502c in FIG. 15).

In a specific example, the SDS configuration operations 1500 performed at block 808 may include SDS storage node composition operations that compose the "new" storage node provided by the SDS subsystem 1502 in the compute node 708 as described above, followed by SDS storage cluster addition operations that add that "new" storage node provided by the SDS subsystem 1502 in the compute node 708 to the storage cluster provided by the storage nodes provided by the SDS subsystems 900 and 902 in compute nodes 706 and 708, respectively. The SDS configuration operations 1500 may then include SDS storage device reassignment identification operations that identify the storage device(s) 712c, 714b, and 714c in the storage systems 712 and 714 used by the "old" storage node provided by the SDS subsystem 902 in compute node 708, respectively, for resassignment to the "new" storage node provided by the SDS subsystem 1502 in the compute node 708, followed by SDS storage device attachment operations that attach those storage device(s) 712c, 714b, and 714c identified for reassignment to the "new" storage node provided by the SDS subsystem 1502 in the compute node 708 (as indicated by the renumbering of the storage device(s) 902a, 902b, and 902c in FIG. 9 to storage device(s) 1502a, 1502b, and 1502c, respectively, in FIG. 15).

The SDS configuration operations 1500 may then include automatic recovery suspension operations that configure the storage nodes provided by the SDS subsystems 900 and 902 in compute nodes 706 and 708, respectively, to suspend automatic data recovery operations, which one of skill in the art in possession of the present disclosure will appreciate prevents the subsequent removal of storage device(s) from those storage node(s) from causing the storage cluster to interpret that storage device removal as a storage device failure and perform corresponding data recovery operations (e.g., data replication operations).

The SDS configuration operations 1500 may then include metadata updating operations that update metadata in the SDS subsystem 902 to remove its ownership of the storage device(s) 712c, 714b, and 714c, and update metadata in the SDS subsystem 1502 to add its ownership of the storage device(s) 712c, 714b, and 714c. The SDS configuration operations 1500 may then include storage device removal operations that remove the storage device(s) 712c, 714b, and 714c from the "old" storage node provided by the SDS subsystem 902 in the compute node 708. Finally, the SDS configuration operations 1500 may then include storage cluster resumption operations that resume operation of the storage cluster provided by the storage nodes 900 and 1502 in compute node 706 and 710, respectively (e.g., while also resuming the automatic data recovery operations discussed above).

The method 800 then proceeds to block 810 where the resource management system provides the SDS system using the at least one of the second subset of resources. In an embodiment, at block 810 and following completion of the SDS configuration operations 1500 at block 808, the storage node provided by the SDS subsystem 900 in the compute node 706 and the "new" storage node provided by the SDS subsystem 1502 in the compute node 708 may be used to provide the SDS system using the same storage devices that were previously being used by the storage node provided by the SDS subsystem 900 in the compute node 706 and the "old" storage node provided by the SDS subsystem 902 in the compute node 708. For example, at block 810, compute and networking resources in the compute node 706 are configured to provide the SDS subsystem 900 that uses its assigned storage device(s) 900a, 900b, and 900c to provide the SDS system that provides storage for the LCS, and compute and networking resources in the compute node 710 are configured to provide the SDS subsystem 1502 that uses its assigned storage device(s) 1502a, 1502b, and 1502c to provide the SDS system that provides storage for the LCS.

Furthermore, one of skill in the art in possession of the present disclosure will appreciate how the switching of resources in the compute node 708 used to provide the LCS may increase or decrease the available compute resources required by the LCS in this example, thus allowing the compute resources provided for the LCS to be scaled up or down while the storage resources provided for the LCS remain the same (which one of skill in the art in possession of the present disclosure will appreciate avoids the need for the costly data migrations that are required in the conventional systems discussed above with static compute resource/storage resource assignments/attachments). Furthermore, while the scaling up or down of compute resources while provisioning the same storage resources in an SDS system has been described, one of skill in the art in possession of the present disclosure will appreciate how networking resource or other resources (or any combinations of compute resources, networking resources, and other resources) may be scaled up or down while provisioning the same storage resources in an SDS system similarly as described above while remaining within the scope of the present disclosure.

Thus, systems and methods have been described that provide for the independent adjustment of storage resources provided by one or more storage systems utilized in an SDS system, and compute resources, networking resources, and/or other resources provided by compute nodes utilized in that SDS system. For example, the dynamic independent SDS resource adjustment system of the present disclosure may include a resource management system coupled to compute nodes and storage system(s) including storage devices. The resource management system monitors a first subset of resources the compute node(s) that are being used to provide an SDS system using the storage devices that are assigned to the first subset of resources, determines that first subset of resources require adjustment, and identifies a second subset of resources in the compute node(s) to provide the SDS system, with the second subset of resources different than the first subset of resources. The resource management system then reassigns at least one of the storage devices from at least one of the first subset of resources to at least one of the second subset of resources, and provides the SDS system using the at least one second subset of resources. As such compute, networking, and/or other resources provided by compute node(s) utilized in an SDS system may be increased or decreased independently of storage resources provided by storage system(s) in that SDS system in order to optimize the use of each of those resources.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A dynamic independent Software Defined Storage (SDS) resource adjustment system, comprising:
  a plurality of compute nodes that are coupled to a network;
  at least one storage system that includes a plurality of storage devices and that is coupled to the plurality of compute nodes via the network; and
  a resource management system that is coupled to the plurality of compute nodes and the at least one storage system via the network, wherein the resource management system is configured to:
    receive a workload intent for a workload;
    configure, based on the workload intent, a first subset of resources in at least one of the plurality of compute nodes to provide an Logically Composed System (LCS) for performing the workload, wherein the configuration of the first subset of resources includes:
      configuring compute resources included in the first subset of resources to perform compute operations for the LCS that include providing an operating system for the LCS; and
      configuring the compute resources and networking resources included in the first subset of resources to provide a Software Defined Storage (SDS) system that performs storage operations for the LCS using the plurality of storage devices that are assigned to the first subset of resources;
    monitor the first subset of resources in the at least one of the plurality of compute nodes that are being used to provide the LCS;
    determine that the first subset of resources in the at least one of the plurality of compute nodes that are being used to provide the LCS require adjustment;
    identify a second subset of resources in at least one of the plurality of compute nodes to provide the LCS, wherein the second subset of resources is different than the first subset of resources;

configure the second subset of resources in the at least one of the plurality of compute nodes to provide the LCS; and
    reassign at least one of the plurality of storage devices from at least one of the first subset of resources to at least one of the second subset of resources such that the at least one second subset of resources provides the SDS system that performs the storage operations for the LCS using the at least one of the plurality of storage devices that were reassigned from at least one of the first subset of resources to the at least one second subset of resources.

2. The system of claim 1, wherein the determining that the first subset of resources in the at least one of the plurality of compute nodes that are being used to provide the LCS require adjustment includes determining that additional resources are needed, and wherein the LCS is provided using the second subset of resources and the first subset of resources.

3. The system of claim 1, wherein the determining that the first subset of resources in the at least one of the plurality of compute nodes that are being used to provide the LCS require adjustment includes determining that fewer resources are needed, and wherein the LCS is provided using the second subset of resources and without using at least some of the first subset of resources.

4. The system of claim 1, wherein the determining that the first subset of resources in the at least one of the plurality of compute nodes that are being used to provide the LCS require adjustment includes determining that either additional resource or fewer resources are needed, and wherein the LCS is provided using the second subset of resources in place of at least some of the first subset of resources.

5. The system of claim 1, wherein the configuring the second subset of resources in the at least one of the plurality of compute nodes to provide the LCS includes:
  configuring compute resources included in the second subset of resources to perform compute operations for the LCS that include providing the operating system for the LCS; and
  configuring the compute resources and networking resources included in the second subset of resources to provide the SDS system that performs storage operations for the LCS using the plurality of storage devices that were reassigned from at least one of the first subset of resources to the at least one second subset of resources.

6. The system of claim 1, wherein the second subset of resources include at least one accelerator device.

7. An Information Handling System (IHS), comprising:
  a processing system; and
  a memory system that is coupled to the processing system and that includes instructions that, when executed by the processing system, cause the processing system to provide a resource management engine that is configured to:
    receive a workload intent for a workload;
    configure, based on the workload intent, a first subset of resources in at least one of a plurality of compute nodes that are coupled to the processing system via a network to provide Logically Composed System (LCS) for performing the workload, wherein the configuration of the first subset of resources includes:
      configuring compute resources included in the first subset of resources to perform compute operations for the LCS that include providing an operating system for the LCS; and configuring the compute resources and networking resources included in the first subset of resources to provide a Software Defined Storage (SDS) system that performs storage operations for the LCS using a plurality of storage devices that are assigned to the first subset of resources and that are coupled to the processing system via the network;

monitor the first subset of resources in the at least one of a plurality of compute nodes that are being used to provide the LCS;

determine that the first subset of resources in the at least one of the plurality of compute nodes that are being used to provide the LCS require adjustment;

identify a second subset of resources in at least one of the plurality of compute nodes to provide the LCS, wherein the second subset of resources is different than the first subset of resources;

configure the second subset of resources in the at least one of the plurality of compute nodes to provide the LCS; and reassign at least one of the plurality of storage devices from at least one of the first subset of resources to at least one of the second subset of resources such that the at least one second subset of resources provides the SDS system that performs the storage operations for the LCS using the at least one of the plurality of storage devices that were reassigned from at least one of the first subset of resources to the at least one second subset of resources.

8. The IHS of claim 7, wherein the determining that the first subset of resources in the at least one of the plurality of compute nodes that are being used to provide the LCS require adjustment includes determining that additional resources are needed, and wherein the LCS is provided using the second subset of resources and the first subset of resources.

9. The IHS of claim 7, wherein the determining that the first subset of resources in the at least one of the plurality of compute nodes that are being used to provide the LCS require adjustment includes determining that fewer resources are needed, and wherein the LCS is provided using the second subset of resources and without using at least some of the first subset of resources.

10. The IHS of claim 7, wherein the determining that the first subset of resources in the at least one of the plurality of compute nodes that are being used to provide the LCS require adjustment includes determining that either additional resource or fewer resources are needed, and wherein the LCS is provided using the second subset of resources in place of at least some of the first subset of resources.

11. The IHS of claim 7, wherein the configuring the second subset of resources in the at least one of the plurality of compute nodes to provide the LCS includes:

configuring compute resources included in the second subset of resources to perform compute operations for the LCS that include providing the operating system for the LCS; and configuring the compute resources and networking resources included in the second subset of resources to provide the SDS system that performs storage operations for the LCS using the plurality of storage devices that were reassigned from at least one of the first subset of resources to the at least one second subset of resources.

12. The IHS of claim 7, wherein the second subset of resources include at least one accelerator device.

13. The IHS of claim 7, wherein the reassignment of the at least one of the plurality of storage devices from at least one of the first subset of resources to at least one of the second subset of resources provides the SDS system that performs the storage operations for the LCS without a data migration.

14. A method for dynamic independent Software Defined Storage (SDS) resource adjustment, comprising:

receiving, by a resource management system, a workload intent for a workload;

configuring, by the resource management system based on the workload intent, a first subset of resources in at least one of a plurality of compute nodes that are coupled to the resource management system via a network to provide an Logically Composed System (LCS) for performing the workload, wherein the configuration of the first subset of resources includes:

configuring compute resources included in the first subset of resources to perform compute operations for the LCS that include providing an operating system for the LCS; and configuring the compute resources and networking resources included in the first subset of resources to provide a Software Defined Storage (SDS) system that performs storage operations for the LCS using a plurality of storage devices that are assigned to the first subset of resources and that are coupled to the processing system via the network;

monitoring, by the resource management system, the first subset of resources in at least one of a plurality of compute nodes that are being used to provide the LCS;

determining, by the resource management system, that the first subset of resources in the at least one of the plurality of compute nodes that are being used to provide the LCS require adjustment;

identifying, by the resource management system, a second subset of resources in at least one of the plurality of compute nodes to provide the LCS, wherein the second subset of resources is different than the first subset of resources;

configuring, by the resource management system, the second subset of resources in the at least one of the plurality of compute nodes to provide the LCS; and reassigning, by the resource management system, at least one of the plurality of storage devices from at least one of the first subset of resources to at least one of the second subset of resources such that the least one second subset of resources provides the SDS system that performs the storage operations for the LCS using the at least one of the plurality of storage devices that were reassigned from at least one of the first subset of resources to the at least one second subset of resources.

15. The method of claim 14, wherein the determining that the first subset of resources in the at least one of the plurality of compute nodes that are being used to provide the LCS require adjustment includes determining that additional resources are needed, and wherein the LCS is provided using the second subset of resources and the first subset of resources.

16. The method of claim 14, wherein the determining that the first subset of resources in the at least one of the plurality of compute nodes that are being used to provide the LCS require adjustment includes determining that fewer resources are needed, and wherein the LCS is provided using the second subset of resources and without using at least some of the first subset of resources.

17. The method of claim 14, wherein the determining that the first subset of resources in the at least one of the plurality of compute nodes that are being used to provide the LCS require adjustment includes determining that either additional resource or fewer resources are needed, and wherein the LCS is provided using the second subset of resources in place of at least some of the first subset of resources.

18. The method of claim 14, wherein the configuring the second subset of resources in the at least one of the plurality of compute nodes to provide the LCS includes:

configuring compute resources included in the second subset of resources to perform compute operations for the LCS that include providing the operating system for the LCS; and configuring the compute resources and networking resources included in the second subset of resources to provide the SDS system that performs storage operations for the LCS using the plurality of storage devices that were reassigned from at least one of the first subset of resources to the at least one second subset of resources.

19. The method of claim 14, wherein the second subset of resources include at least one accelerator device.

20. The method of claim 14, wherein the reassignment of the at least one of the plurality of storage devices from at least one of the first subset of resources to at least one of the second subset of resources provides the SDS system that performs the storage operations for the LCS without a data migration.

\* \* \* \* \*